US007353188B2

(12) United States Patent
Yim et al.

(10) Patent No.: US 7,353,188 B2
(45) Date of Patent: Apr. 1, 2008

(54) PRODUCT SELLING SYSTEM AND METHOD FOR OPERATING THE SAME

(75) Inventors: Young Ho Yim, Kyonggi-do (KR); Baek Geun Ahn, Inchon-shi (KR); Deok Kee Kim, Seoul (KR)

(73) Assignee: LG Electronics, Seoul (KR)

( * ) Notice: Subject to any disclaimer, the term of this patent is extended or adjusted under 35 U.S.C. 154(b) by 526 days.

(21) Appl. No.: 09/893,687

(22) Filed: Jun. 29, 2001

(65) Prior Publication Data
US 2002/0002511 A1 Jan. 3, 2002

(30) Foreign Application Priority Data
Jun. 30, 2000 (KR) ............................. 2000-37253
Jun. 30, 2000 (KR) ............................. 2000-37255

(51) Int. Cl.
*G06Q 30/00* (2006.01)
(52) U.S. Cl. ......................................... 705/26; 705/27
(58) Field of Classification Search ............ 705/26–27; 345/419; 700/28–32, 95, 96–98; 434/72, 434/79; 703/1, 6, 7; G06F 17/60
See application file for complete search history.

(56) References Cited

U.S. PATENT DOCUMENTS

| | | | | |
|---|---|---|---|---|
| 4,835,704 A | * | 5/1989 | Eichelberger et al. | 716/21 |
| 5,027,400 A | * | 6/1991 | Baji et al. | 725/116 |
| 5,206,804 A | * | 4/1993 | Thies et al. | 705/27 |
| 5,402,358 A | * | 3/1995 | Smith et al. | 716/9 |
| 5,684,724 A | * | 11/1997 | Sutherland | 703/13 |
| 5,782,027 A | * | 7/1998 | Gildea | 40/538 |
| 5,848,399 A | * | 12/1998 | Burke | 705/27 |
| 5,850,352 A | * | 12/1998 | Moezzi et al. | 345/419 |
| 5,974,400 A | * | 10/1999 | Kagami et al. | 705/26 |
| 6,026,377 A | * | 2/2000 | Burke | 705/27 |
| 6,034,739 A | * | 3/2000 | Rohlfing et al. | 348/586 |
| 6,061,939 A | * | 5/2000 | Gildea | 40/538 |
| 6,163,623 A | * | 12/2000 | Ohta | 382/176 |

(Continued)

FOREIGN PATENT DOCUMENTS

JP    10-97558    4/1998

(Continued)

OTHER PUBLICATIONS

D. Casasent et al., Hybrid Image and Signal Processing it, Proc. SPIE Tchnical Symposium, Apr. 1990, Orlando, Florida (1990).*

(Continued)

*Primary Examiner*—James Zurita
(74) *Attorney, Agent, or Firm*—Ked & Associates, LLP

(57) ABSTRACT

A product selling system is provided which allows clients with networks accessible to the Internet to contact a service provider network for purchases. The service provider network includes a database with three dimensional (3D) image data for a variety of its products, and an application which allows a 3D product image to be integrated into a corresponding 3D image of a projected receiving space for the product prior to purchase. A web server which has a program operative with the database facilitates image manipulation to produce a 3D sample image from a product image on the web page if a client desires.

37 Claims, 22 Drawing Sheets

U.S. PATENT DOCUMENTS

| | | | |
|---|---|---|---|
| 6,169,992 B1* | 1/2001 | Beall et al. | 707/103 R |
| 6,291,293 B1* | 9/2001 | Miyai et al. | 438/253 |
| 6,292,827 B1* | 9/2001 | Raz | 709/217 |
| 6,304,855 B1* | 10/2001 | Burke | 705/27 |
| 6,307,558 B1* | 10/2001 | Mao | 345/428 |
| 6,307,568 B1* | 10/2001 | Rom | 345/629 |
| 6,307,573 B1* | 10/2001 | Barros | 715/764 |
| 6,336,035 B1* | 1/2002 | Somoza et al. | 455/446 |
| 6,337,688 B1* | 1/2002 | Berstis | 345/473 |
| 6,380,934 B1* | 4/2002 | Freeman et al. | 345/419 |
| 6,381,583 B1* | 4/2002 | Kenney | 705/26 |
| 6,384,834 B1* | 5/2002 | Watanabe | 345/582 |
| 6,390,063 B1* | 5/2002 | Obata et al. | 123/399 |
| 6,438,263 B2* | 8/2002 | Albeck et al. | 382/154 |
| 6,449,103 B1* | 9/2002 | Charles | 359/725 |
| 6,498,958 B1* | 12/2002 | Tateishi et al. | 700/47 |
| 6,765,574 B1* | 7/2004 | Mao et al. | 345/428 |
| 6,792,401 B1* | 9/2004 | Nigro et al. | 703/6 |
| 6,813,610 B1* | 11/2004 | Bienias | 705/27 |
| 7,043,457 B1* | 5/2006 | Hansen | 705/80 |
| 7,110,966 B1* | 9/2006 | FitzGerald et al. | 705/26 |
| 2003/0171190 A1* | 9/2003 | Rice | 482/57 |

FOREIGN PATENT DOCUMENTS

| | | |
|---|---|---|
| KR | 1019950012736 | 7/1994 |
| KR | 10-1999-0078775 | 5/1999 |
| KR | 10-1999-0068557 | 6/1999 |
| KR | 1020000024523 | 5/2000 |

OTHER PUBLICATIONS

Debevec et al., Modeling and rendering architecture from photographs: A hybrid geometry—and image-based approach, Technical Report UCB//CCD-96-893, Jan. 1996.*

Katherine Tyrka, Part libraries on the web: 2D & 3D manufacturers'standard parts can be downloaded in variety of native or neutral formats from the web, saving time & effort to complete assembly design, Design News, Jan. 7, 2002 (findarticles.com).*

Bill Fane, IronCAD 2.0 provides 3D modeling power: 3D modeling & animation are the strong suits of Visionary Design System's MCAD product, CADalyst, Aug. 1999 (from http://www.findarticles.com, 8 pages).*

Bill Schweber, Prototyping tools transform design dream into reality, EDN, May 13, 1999 (from http://www.findarticles.com 10 pages).*

Tony Hotchkiss, Customization options:Make AutoCAD 2000 do what you want, CADalyst, Jul. 2000 (from http://www.findarticles.com, 7 pages).*

Robert Martin, Solid modeler delivers clever productivity features, Machine Design, Aug. 20, 1998 (from http://www.findarticles.com, 3 pages).*

Debecec et al., Modeling & rendering architecture from photographs: A hybrid geometry and image-based approach, Technical Report UCB//CCD-96-893, Jan. 1996.*

Tyrka, Part libraries on the web: 2D & 3D manufacturers's standard parts can be downloaded in a variety of native or neural formats from the web, saving time & effort to complete assembly design, Design News, Jan. 7, 2002 (in findarticles.com).*

Meir et al., derwent-acc-no: 2000-001700, titled: Digital processing method of correlating 2D images to form a 3D reconstruction for graphic animation, Nov. 17, 1999.*

Unknown, AUTOCAD R14—Basic 3D, from http://www.cadtutor.net/acad/acadr14/3d-basic/3d-basic.html.*

Unknown, 3D from http://www.caddigest.com/subjects/autocad/tutorials/3d.htm, printed on Aug. 25, 2005.*

Curt Franklin, Howstuffworks "How 3-D Graphics Work", from http://computer.howstuffworks.com/3dgraphics.htm/printable, printed on Aug. 25, 2005.*

Unknown, 3D Interior Rendering in India, 3D Kitchen Interio Design, from http://www.thenextdesign.com/3D-interior-rendering.htm, printed out on Aug. 25, 2005.*

Unknown, 3D Modeling and Animation Links—Free Models, from http://www.kunstwissen.de/fach/f-kuns/comp/brymod.htm, printed on Aug. 25, 2005.*

Unknown, a 3D picture representations of 3D objects on 3D environment, from http://news.thomasnet.com/images/large/2005/03/461224.jpg printed on Aug. 25, 2005.*

Unknown, Basic 2D and 3D Graphics, from http://www.liv.ac.uk/~qq04/gusgs/GSbasicg.html, printed out on Aug. 25, 2005.*

Geoffrey Moore Langdon, AutoCad Architectural Desktop, from http://www.architecturalcadd.com/cadence-mag/1098/1098.htm, printed out on Aug. 25, 2005.*

T. Panayiotopoulos et al., Web-based, dynamic and intelligent simulatioon systems, Proceedings of the IASTED International Conference, Aug. 14-16, 2000—Hawaii, USA.*

Unknown, AC3D—Web 3D, from http://www.3dlinks.com/links.cfm?categoryid=1&subcategoryid=3, printed out on Aug. 25, 2005.*

P. J. Costello et al., eD model databases: the availability of 3D models on the World Wide Web, published on Jun. 16th 1997 (46 pages).*

Ralf Helbing et al., A flexible approach to modeling computer visualization using simulation traces, from http://isgwww.cs.uni-magdeburg.de/~helbing/publ/plugins.html, printed out on Aug. 25, 2005.*

Unknown, 3D image models from http://www.raumpartikel.de/subsites/projects/studies.htm, printed out on Aug. 25, 2005.*

Unknown, 3D office furnitures in 3D environments from http://www.kit3models.com/, 6 sheets were printed out on Aug. 25, 2005.*

Sullivan, in Consulting—Specifying Engineer. Denver: Oct. 1999. vol. 26, Iss. 4; p. 54, 3 pgs, downloaded from ProQuest on the Internet on Sep. 29, 2007.*

* cited by examiner

FIG.19A

| ◆heat transfer loss-glass | | | | | |
|---|---|---|---|---|---|
| item | direction coefficient | area | temperature difference | K | heating load |
| glass | (A) | y | ⑤ | ci | (B) |
| | (A) | y | ⑤ | ci | (B) |
| | (A) | y | ⑤ | ci | (B) |
| | (A) | y | ⑤ | ci | (B) |

| ◆heat transfer loss-outside wall | | | | | |
|---|---|---|---|---|---|
| item | direction coefficient | area | temperature difference | K | heating load |
| outside wall | (A) | bf | ⑤ | bp | (C) |
| | (A) | bg | ⑤ | bq | (C) |
| | (A) | bh | ⑤ | br | (C) |
| | (A) | bi | ⑤ | bs | (C) |
| roof | (A) | bj | ⑤ | bt | (C) |

(A) : direction coefficient (B) : direction coefficient∗area∗temperature difference∗K (C) : direction coefficient∗area∗temperature difference∗K (D) : direction coefficient∗area∗temperature difference∗K (E) : number ventilation air change (F) : air volume∗temperature difference∗coefficient (G) : coefficient∗absolute humidity difference∗air volume (H) : amount of added moist∗600

Total : (B)+(C)+(D)+(F)+(H)

FIG.19A
(Continued)

| ◆heat transfer loss-inside surface,floor(except outside wall and roof) ⑤ | | | | | |
|---|---|---|---|---|---|
| item | direction coefficient | area | temperature difference | K | heating load |
| cieling | (A) | cb | ⑤ | cj | (D) |
| floor | (A) | cc | ⑤ | ck | (D) |
| partition | (A) | cd | ⑤ | cl | (D) |

| ◆room heat loss-ventilation | | | | |
|---|---|---|---|---|
| item | air volume | temperature difference | coefficient | heating load |
| ventilation | (A) | ⑤ | 0.288 | (F) |

| ◆room heat loss-ventilation | | | | |
|---|---|---|---|---|
| item | coefficient | absolute humidity difference | air volume | amount of added |
| amount | 1.2 | ⑨ | (E) | (F) |
| load | moist amount * 600 | | (H) | |

| ◆heating load | sum | Total |
|---|---|---|

FIG.19B

▣ heat generation from other apparatuses(kcal/hr)

| apparatus | sensible heat | latent heat | remark |
|---|---|---|---|
| lighting, electric heater(per kw) | 860 | − | |
| fluorescent lamp(per kw) | 1,000 | − | |
| coffee pot 1.0Lit(GAS) | 100 | 25 | |
| toaster 15 x 28 x 23cm(electric heat) | 610 | 110 | |
| domestic stove | 1,800 | 200 | |
| hair dryer for beauty parlor(115v) | 470 | 80 | |
| motor(94~375w) | 1,060 | − | |
| motor(0.375~2.25kw) | 920 | − | |
| motor(2.25~15kw) | 740 | − | |
| refrigerator,fan(0~0.4kw) | 1,140 | − | |
| refrigerator,fan(0.75~3.7kw) | 1,100 | − | |
| refrigerator,fan(3.7~15kw) | 1,000 | − | | load of incandescent lamp(kcal/h)=watt×0.86 load of fluorescent lamp(kcal/h)=watt×1.25×0.86
=watt×1.08 the 1.25 times in the load of fluorescent lamp is for a power consumption of ballast

FIG.19C

| working state | | total heat generation | 28(°C) (SH) | 28(°C) (LH) | 27(°C) (SH) | 27(°C) (LH) | 26(°C) (SH) | 26(°C) (LH) | 24(°C) (SH) | 24(°C) (LH) |
|---|---|---|---|---|---|---|---|---|---|---|
| working state | site | | | | | | | | | |
| sit on chair | theater | 88 | 44 | 44 | 49 | 39 | 53 | 35 | 58 | 65 |
| light work | school | 101 | 45 | 56 | 49 | 52 | 53 | 48 | 61 | 69 |
| office work | office, hotal, depertment store | 113 | 45 | 68 | 50 | 63 | 54 | 59 | 62 | 72 |
| sit/stand | bank | 126 | 45 | 81 | 50 | 76 | 55 | 71 | 64 | 73 |
| sit and work | dining room/ quest room | 139 | 48 | 91 | 56 | 83 | 62 | 77 | 71 | 81 |
| sit and work | light workate factory | 189 | 48 | 141 | 56 | 133 | 62 | 127 | 74 | 92 |
| general dancing | dance hall | 215 | 56 | 159 | 62 | 153 | 69 | 146 | 82 | 101 |
| walk(4.8km/h) | factory | 252 | 68 | 184 | 76 | 176 | 83 | 169 | 96 | 116 |
| bowling | bowling lane | 365 | 113 | 252 | 117 | 248 | 121 | 244 | 132 | 153 |

PRODUCT SELLING SYSTEM AND METHOD FOR OPERATING THE SAME

BACKGROUND OF THE INVENTION

1. Field of the Invention

The present invention relates to e-commerce, and more particularly, to an on-line product selling system between an enterprise and an individual, and between enterprises, and a method for operating the same, in which a client can make simulation taking own room structure into consideration in selection, and buying the product.

2. Background of the Related Art

In general, enterprises providing services based on computers permit clients (individuals, enterprises, and government) to make access to them by using their home pages, for advertisement of the enterprises. Particularly, the enterprises provide activities, such as an association of like-minded persons, on their home page of the enterprises for exchanging various information on the enterprises to share information between many persons. FIG. 1 illustrates a related art system of e-commerce, schematically.

That is, the related art system of e-commerce has a network of a service provider who provides services (conventional information providing services, product sales services, and the like), and a network of a buyer (government, enterprises, and individual). As the networks can be connected through Internet, the e-commerce is made available. Other than the above systems, there may be a banking network for settlement of accounts following the provision of services, and a delivery network for delivery of the products connected thereto, additionally. FIG. 2 illustrates a flow chart showing the steps of a related art process for making the foregoing e-commerce, schematically.

That is, in the related art process for making the foregoing e-commerce, the buyer (government, enterprises, and individual) makes access to the home page the service provider (an enterprise) operates, selects, buys a required product, and pays for the provided service. In this instance, the payment by the buyer is made through respective banking organization connected to the service provider, upon making confirmation of which the service provider provides the service required by the buyer.

For an example, when a buyer intends to buy an air conditioner, the buyer makes access to the home page of the service provider who sales a required air conditioner the buyer intends to buy, and selects a required air conditioner with reference to a type of the air conditioner and a room size. In this instance, a shape of the air conditioner is provided on the home page of the service provider in an image, like a photograph, for the buyer to select the product taking the provided shape and a room size the buyer lives in into account. When the buyer decide upon a product through the foregoing process, the service provider requests for settlement of accounts for the selected product, and delivers the product to a place designated by the buyer when the buyer settles accounts. In this instance, the settlement of accounts are made through respective banking organization connected to the service provider, and the delivery of the product is made through a delivery enterprise connected to the service provider.

However, cases are frequently occurred when the buyer returns the product delivered in the foregoing process of product sales as the product is not satisfactory. That is, considering that in general the buyer buys the air conditioner without knowing the know-how to buying an air conditioner, installation, product specification, and the like accurately, but merely watching the photograph of the air conditioner displayed on the home page, it is quite probable that the buyer feels unsatisfactory that the air conditioner is not what the buyer wanted. Particularly, there have been many cases when the buyers return the air conditioners because the bought air conditioners are not fit to inside structures of actual buildings. At the end, the foregoing cases causes problems of unnecessary waste of material handling cost coming from delivery and returning of the air conditioners.

Moreover, if the buyer of the air conditioners is not an individual, but an enterprise (particularly, a building owner), though the buyer buys a substantial number of air conditioner at a time, credit can not be secured from the enterprise in a related art e-commerce system, to be involved in inconvenience of receiving the enterprise's personal inspection of the products, and providing installation drawings for installation of the products to the building. Particularly, the installation of the products is substantially troublesome, and requires the buyer to provide an extra program for conducting the installation.

Moreover, the foregoing related art e-commerce process is only suitable for an e-commerce between an enterprise and an individual (B2C), but not between enterprise and enterprise who requires to buy a large volume of products, consequently to develop an e-commerce system between enterprises B2B, presently. FIG. 3 illustrates a flow chart showing the steps of a process for making an e-commerce between enterprises, schematically.

That is, a person in charge of procurement in a government or an enterprise makes an access to a home page of a relevant service provider (an enterprise), selects required products, and requests for an estimation. Then, the service provider fixes estimation with appropriate sales conditions contained therein, and transmits the estimation to the person in charge. Then, the person in charge receives, and reviews the estimation, and determines of making contract. If the person in charge intends to make a contract, the person in charge makes contract through personal meeting with a person in charge of sales in the service provider, thereby completing the procurement.

However, the foregoing e-commerce system is only applicable between enterprises, but not between an enterprise and individuals. That is, in general since the system operates a home page for experts, not only no memberships are given to individuals, but also provided services are expressed for the experts of the field, such that understanding by the individuals are somewhat difficult.

Moreover, though the foregoing system is for trade between enterprises, the service provider only operates a system for a simple large volume product sales, but provides no services that allows the person in charge of procurement an easier selection of the products, or making a simple application design of the selected product. That is, the related art e-commerce simply provides information on availability, and specification of the products, but not technical support for virtual installation of the product inside of a building based on the information provided.

Particularly, an enterprise selling various products used inside of a general building makes almost no sales in the foregoing e-commerce type, but in general in a type in which the person in sales visits to a designer's office, obtains drawings of the building design, draws an installation drawing, and suggests installation of the products to the designer's office. Then, the designer's office proposes the installation drawings to the building owner, with subsequent negotiation, to get approval of the installation from the building owner.

Eventually, when the foregoing various matters are took into account, an application range of the related art computer based commerce to the sales between enterprises can not, but be extremely limited to a small range. Moreover, the from door to door type advertisement and sales mostly done for the product coming from the above problems requires much man power and cost.

SUMMARY OF THE INVENTION

Accordingly, the present invention is directed to a product selling system, and a method for operating the same that substantially obviates one or more of the problems due to limitations and disadvantages of the related art.

An object of the present invention is to provide a product selling system, and a method for operating the same, which permits client a satisfactory selection of products, to induce a reduction of a material handling cost caused by unnecessary return/change of products, and to improve satisfaction of the clients.

Another object of the present invention is to provide a product selling system, and a method for operating the same, which facilitates e-commerce between an individual and an enterprise, and between enterprises, and selective access for the e-commerce.

Further object of the present invention is to provide a product selling system, and a method for operating the same for improving a reliability of clients, which can provide a virtual state the product is installed in a building as a reference for providing an installation drawing even if a product state is not made known by person, and permits the client an easy installation of the product in the building.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the product selling system includes clients networks accessible to Internet, and a service provider network including a data base having 3D image data of various products, and sample data of 3D images of parts the various products are to be applied thereto, and a web server having a program operative in connection with the data base for facilitating a manipulation of combining a product image to a 3D sample image on the web page if a client desires.

The service provider network further includes data bases having information on clients and different information for providing services respectively, and the web server is programmed such that different classes of clients are selectively logged-in to different web pages which provide different services.

In another aspect of the present invention, there is provided 8. A method for operating a product selling system, including the steps of (a) a client making access to a web server of a product selling enterprise by using a client's own network, (b) the client searching a required product, (c) modeling a 3D image of a searched product and displaying on the web page, (d) making a 3D installation simulation of the product to a part the product is to be installed on the web page upon reception of request from the client, and (e) receiving various information required for selling the product if the client intends to buy the product, returning to any one prior step if the client cancels the intention to buy the product, and repeating the foregoing steps as far as there is no particular expression of intention from the client.

The step (a) includes the steps of the client logging-in a web page, the client being one of a plurality of groups of clients classed with reference to purposes of access, such as individuals or experts of the field or enterprises, and the web server selectively providing products meeting to the client's purpose of access when the client is logged-in a relevant web page.

The present invention suggests to store 3D image data on various selling products as well as 3D image data on parts the selling products are to be applied in a data base in a product selling network, for making 3D simulation of installation of the products to the parts, thereby permitting the user to select product fit to the client's preference and a room structure of the client.

The present invention suggests a product selling system, in which clients are classified into client such as experts and enterprises, and individuals, and provided with selective services according to the classification. If the clients are the experts and the enterprises, the product selling system is made to be controlled in an operation type of an e-commerce system between enterprises, and if the clients are individuals, the product selling system is made to be controlled in an operation type of an e-commerce between an enterprise and an individual.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiments of the present invention, examples of which are illustrated in the accompanying drawings 4~19C.

Figure 1:
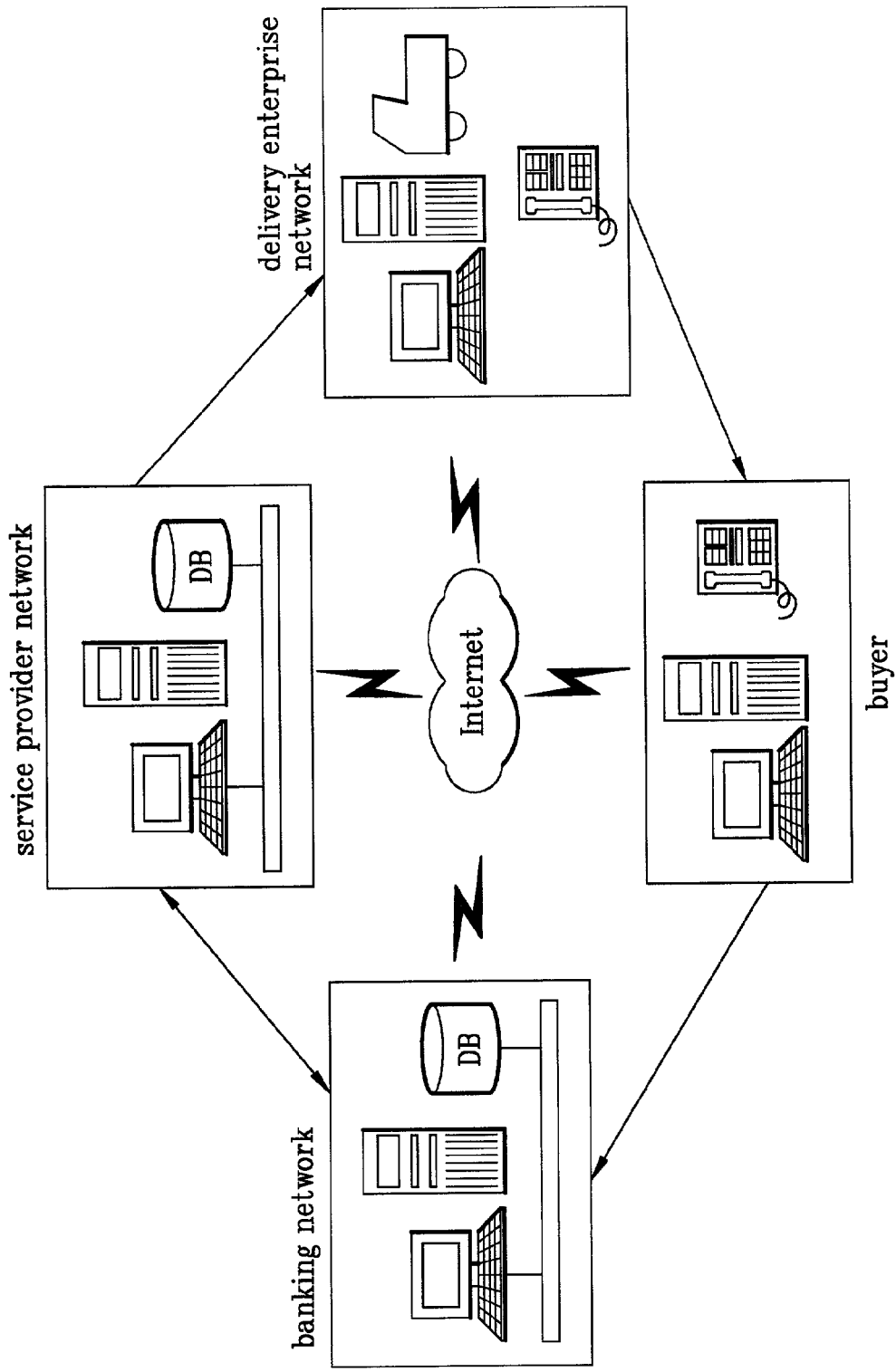
FIG. 1 illustrates a related art system of e-commerce, schematically.
Figure 2:
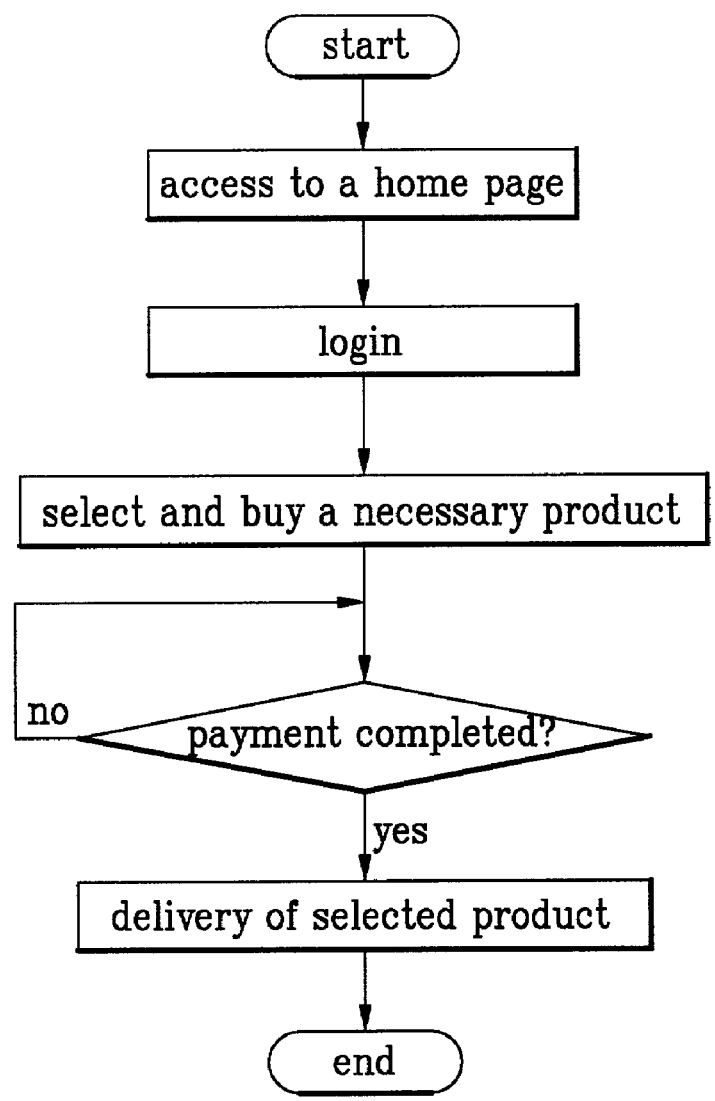
FIG. 2 illustrates a flow chart showing the steps of a related art process for making the e-commerce in FIG. 1, schematically.
Figure 3:
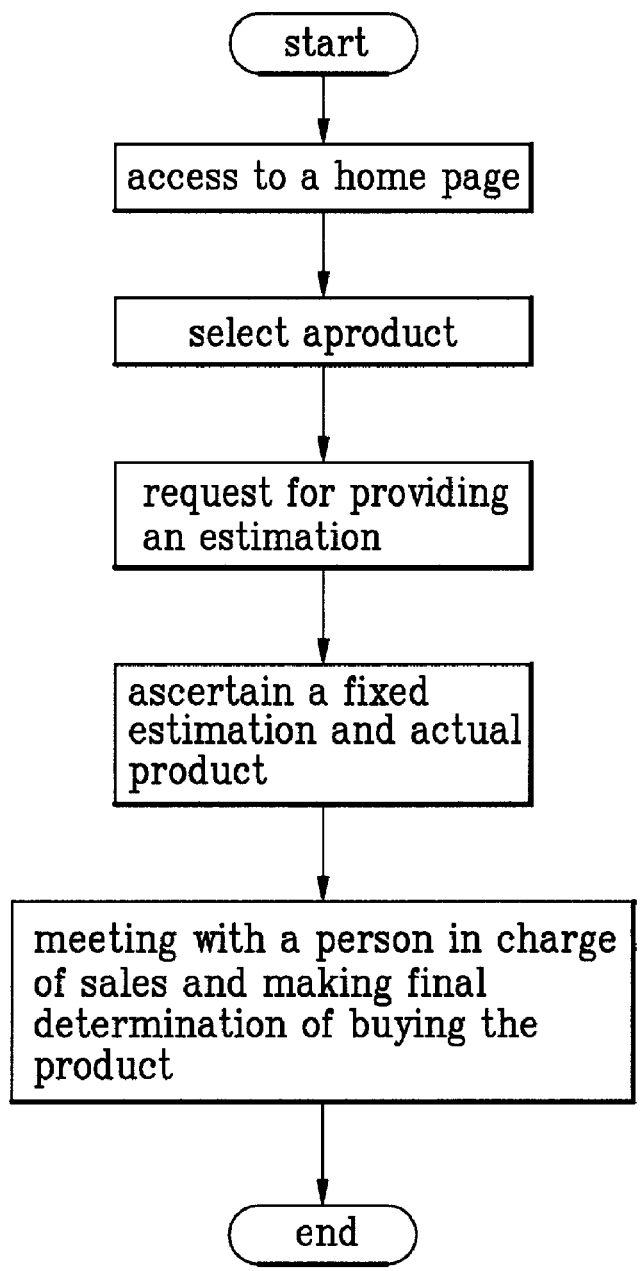
FIG. 3 illustrates a flow chart showing the steps of a process for making an e-commerce between enterprises, schematically.
Figure 4:
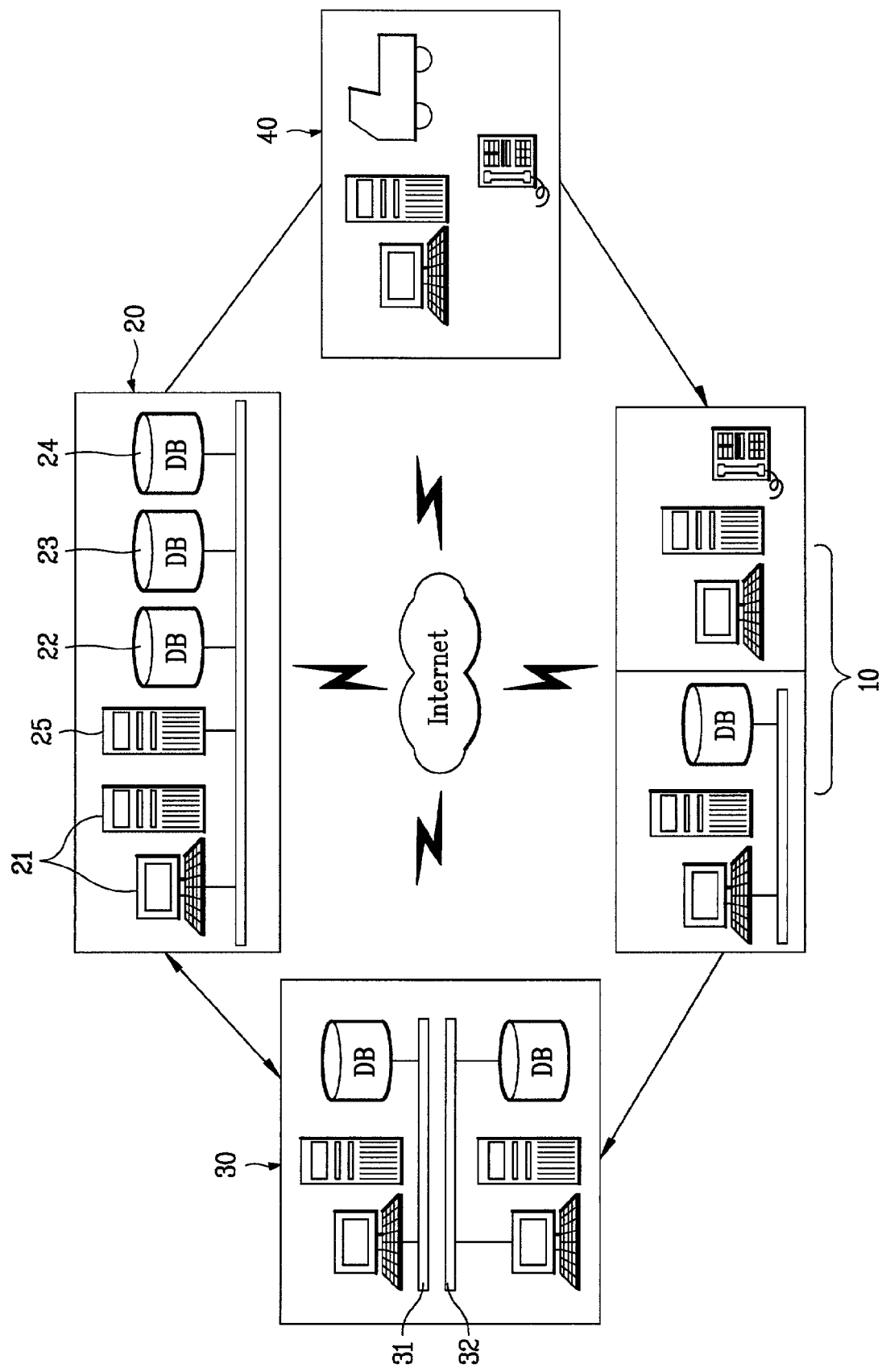
FIG. 4 illustrates a product selling system in accordance with a preferred embodiment of the present invention, schematically.

Referring to FIG. 4, a product selling system in accordance with a preferred embodiment of the present invention includes a client network 10 accessible to Internet, and a service provider network 20 for providing different sales services to different clients. The service provider network 20 includes a data base (DB) 22 having 3D image data on different products, and 3D image data on different product application parts, and a web server 21 connected to the data base and having a web server built up therein. The product application parts may be insides of buildings of various purposes, such as buildings, apartments, shops, family houses, restaurants, hospitals, health clubs, convention buildings, fast food stores now in fashion, and the like. As explained, the products may be air conditioners, various electronic appliances, sinks and shelves in kitchens, furniture, various wash basins in bath rooms, lighting fixtures, interphones, elevators, escalators, and the like.

The web server 21 has a program for simulating installation of the product in a sample of the 3D image of an inside structure of the building stored in the data base 21 when the client wants. The program for the simulation may be any generally known 3D graphic program, of which detailed operation principle will be omitted. The web server 21 has a program for calculating a limitation of application of the product according to different information of building received through the client network 20, and suggesting more than one products having specifications within a range of the calculated application limitation.

Together with this, the web server 21 requests for information on the required products for the client to search for necessary products. The requested information includes information at least inside/outside structures of a place of product installation, and purposes of use of the product. The program for searching products within the range of the calculated limitation of application, or a required product may be any one selected from general engine for retrieval technique, engine for content based retrieval technique, or engine for annotation based retrieval technique, of which detailed explanation will be omitted.

The web server 21 has a system which facilitates selective login to different web pages which provide different services according to classification of clients, and the service provider network 20 has a separate data base 23 for storing information on the different clients. Moreover, the service provider network 20 has a separate delivery information storage data base 24 for storage of delivery information, such as delivery due dates, delivery of various products, and the like. Moreover, the service provider network 20 may include a mail server 25 for exchange of e-mails when the client is an expert or an enterprise in the field.

The service provider network 20 is built up connected with banking organization 30 both for facilitating large, and small amount settlements of accounts to be ready for different settlements of accounts for individuals and enterprises. Therefore, it is preferable that the banking organization 30 has a network 31 having a settlement system for small amounts built up therein, and a network 32 having a settlement system for large amounts built up therein.

Other than the foregoing systems, the service provider network 20 may be built up connected with a delivery network 40 additionally for delivery of products following the provision of general services.

A method for operating the foregoing product selling system will be explained, taking a method for selling a general air conditioner as an example.

Figure 5:
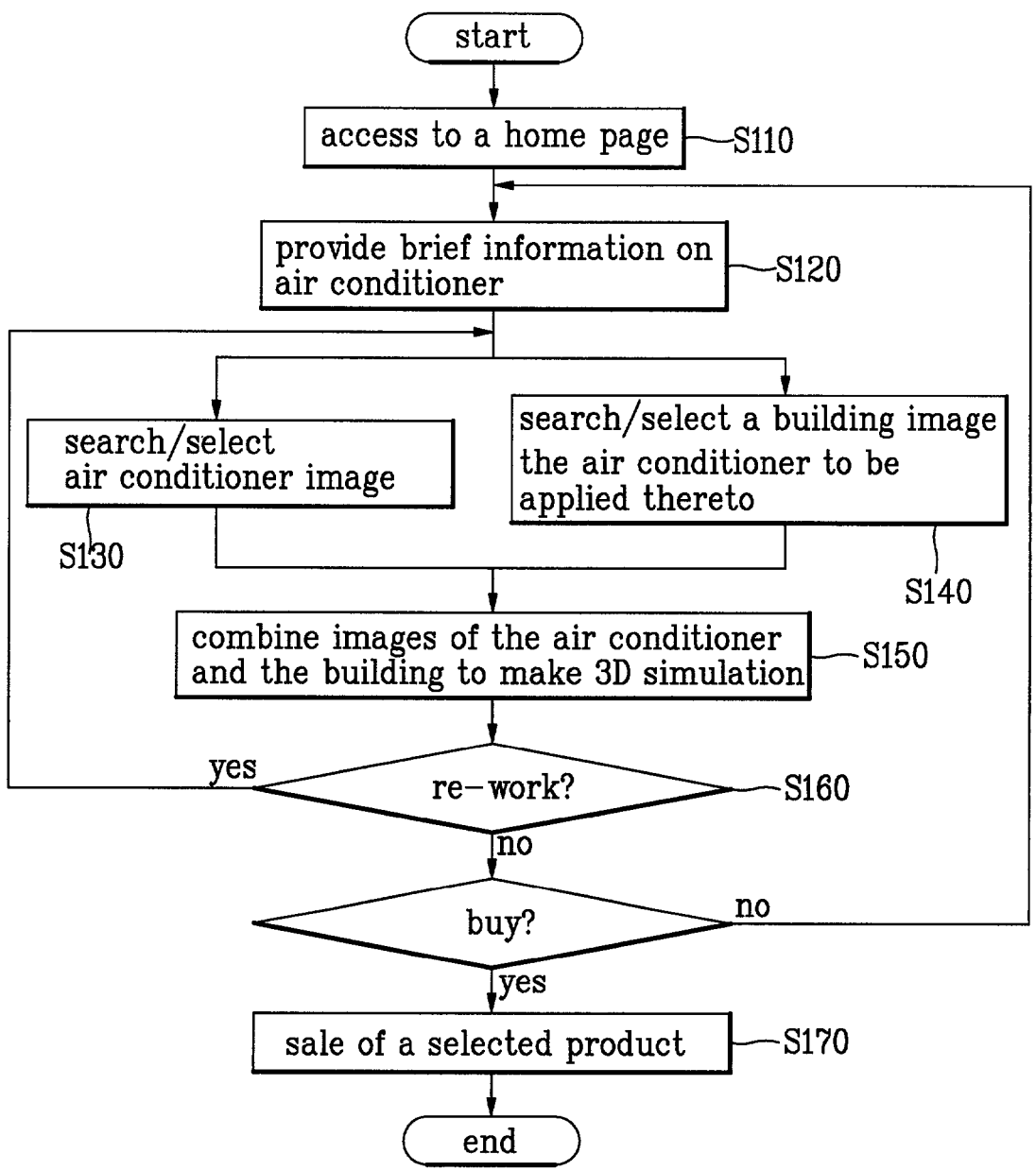
FIG. 5 illustrates a flow chart showing the steps of a process for operating a product selling system in accordance with a preferred embodiment of the present invention, schematically.

Referring to FIG. 5, when a client makes access to a web page of a service provider through Internet by using the client's computer (S110), a web server of the service provider provide brief information on various air conditioner under sales to the client in connection with a data base (S120). The provided information may include kinds of air conditioners, direction for installation and use of various air conditioners, calculation of heating/cooling loads, sizes of products, appropriate room sizes for the products, prices, photographs of the products, functions of the products, features and advantages of the products.

Then, the client selects a required air conditioner by searching displayed air conditioner images, or providing information on the required air conditioner directly (S130), and selects a pertinent building by searching a building the air conditioner is to be installed or providing information on the building (S140).

Next, when the client selects required air conditioner and building, the web server composites an image of the air conditioner with an image of the building, to provide a 3D simulation image to the client (S150). The foregoing process is repeated until the client is satisfied (S160).

When there is a request for buying the air conditioner from the client, after various information on product sales is received, the web server carries out successive works in association with a banking organization and a delivery enterprises (S170). If the client cancels the buy of the air conditioner, the process returns to a step of providing information on other air conditioner, and repeats the foregoing steps, which will be explained in detail.

Figure 6:
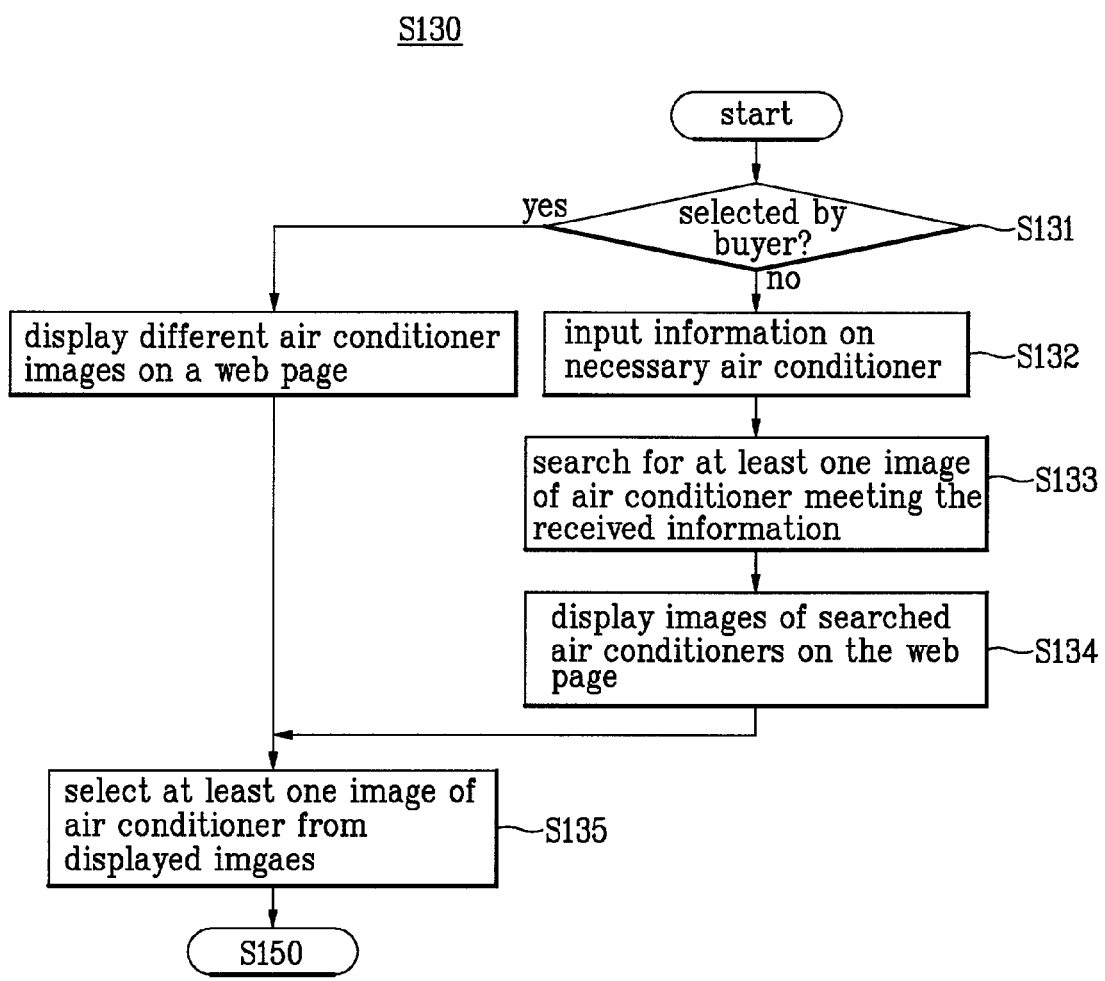
FIG. 6 illustrates a flow chart showing the substeps of the step for searching an image of a required product and selecting the product in the process in FIG. 5.

Referring to FIG. 6, in the step (S130) of a client searching and selecting an air conditioner image, either the client identifies information on an air conditioner displayed on the web page and selects the air conditioner, or the client provides information on a required air conditioner to the web server, and selects the required air conditioner, at the client's option (S131).

In the case the client provides information on the required air conditioner to the web server, the information is applied to a pertinent space on the web page (S132). Then, the web server searches a data base for an air conditioner fit to the information from the client (S133). The information applied to the space is on various information on air conditioners, or application positions of the air conditioners, provided on the web page. The information on application positions of the air conditioners includes a room size, a number of persons in the room, purposes of the room, and the building (a restaurant, a conference room, a shopping mall, a family house, or etc.), an interior material of the building (glass, gypsum board, or etc.), ventilation of the building (ventilation capacity, a number of ventilation openings, and etc.), a structure of the space of the building (a number of rooms, and etc.).

Therefore, when the client provides information on the required air conditioner, such as cooling/heating loads, and a desired buying price, or an application position of the air conditioner, the web server 21 searches information stored in the data base 22 for kinds and a number of air conditioners having a specification meeting the provided information, and displays on the web page (S134). The air conditioner is displayed in a 3D image on the web page, such that the client can manipulate the image as the client desires, to permit a virtual installation of the air conditioner as the client moves the image (S150). The manipulation of the image on the displayed web page is made by using various input devices, such as a mouse or a key board. Together with this, the 3D image on the web page is provided with a zoom in/out function, so that the client enlarges/reduces a particular part of the product.

Figure 7:
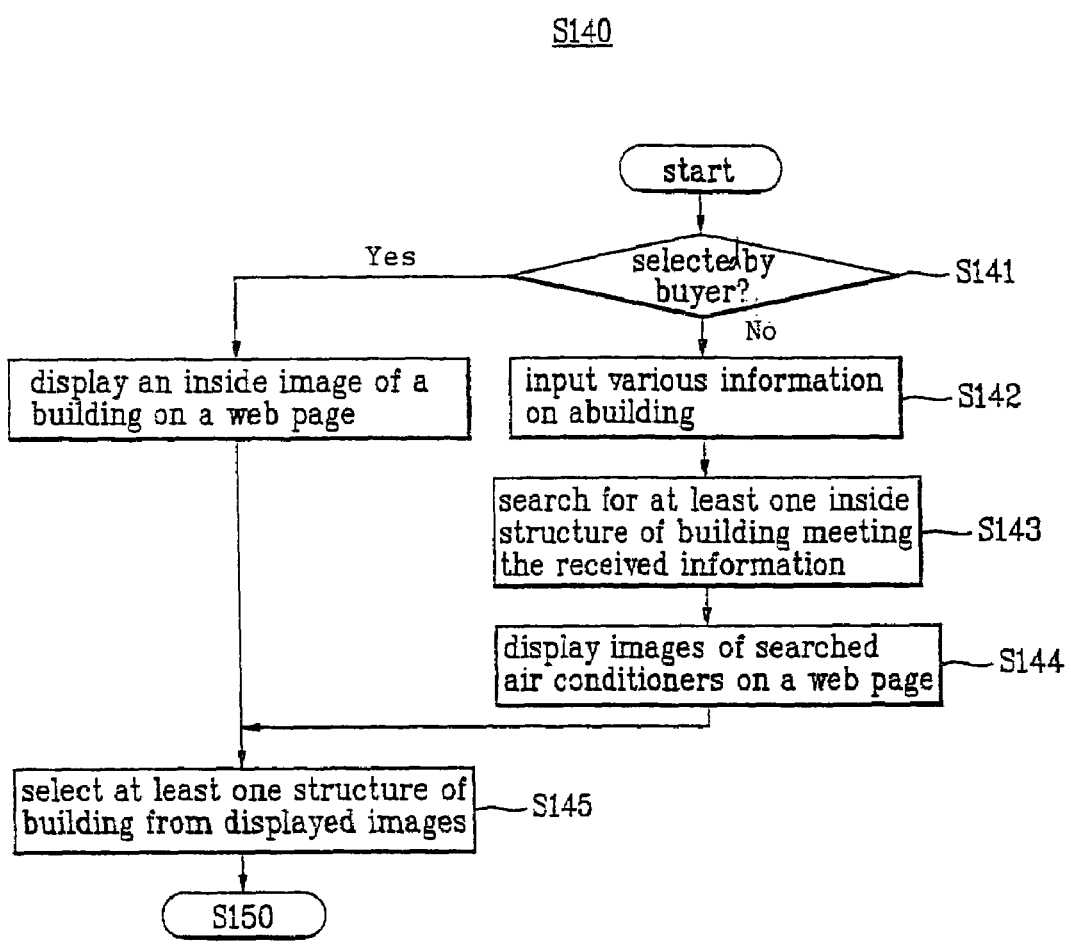
FIG. 7 illustrates a flow chart showing the substeps of the step for searching an image of a building the product is to be installed therein and selecting the building in the process in FIG. 5.

FIG. 7 illustrates a flow chart showing the substeps of the step for searching an image of a building the product is to be installed therein and selecting the building in the process in FIG. 5.

Referring to FIG. 7, along with the foregoing steps, depending on whether or not a building is selected by the buyer (S141) the web server 21 recommends at least one 3D inside structure sample of a building depending on selection of the client. In the step (S140) of the client searching and selecting a building image the air conditioner is to be installed therein too, the building image can be selected as the building information displayed on the web page is selected by the client, as shown on the left side of the flow chart in FIG. 7 or as the client provides the building information the air conditioner is to be installed therein to the web page and the web page detects the provided building information, as shown on the right side of the flow chart shown in FIG. 7, at the client's option. In the case the client provides information on an application position the client wants to install the air conditioner (S142), this is made possible as the web server searches the data base 22 based on the information for building information (S143) and displays an image of the most approx. structure of a building (S144).

However, even if the web server 21 recommends no building image, the selection of the building may be done as the client selects one from sample images of shopping malls and buildings provided on the web page directly (S145), at the client's option.

Figure 8:
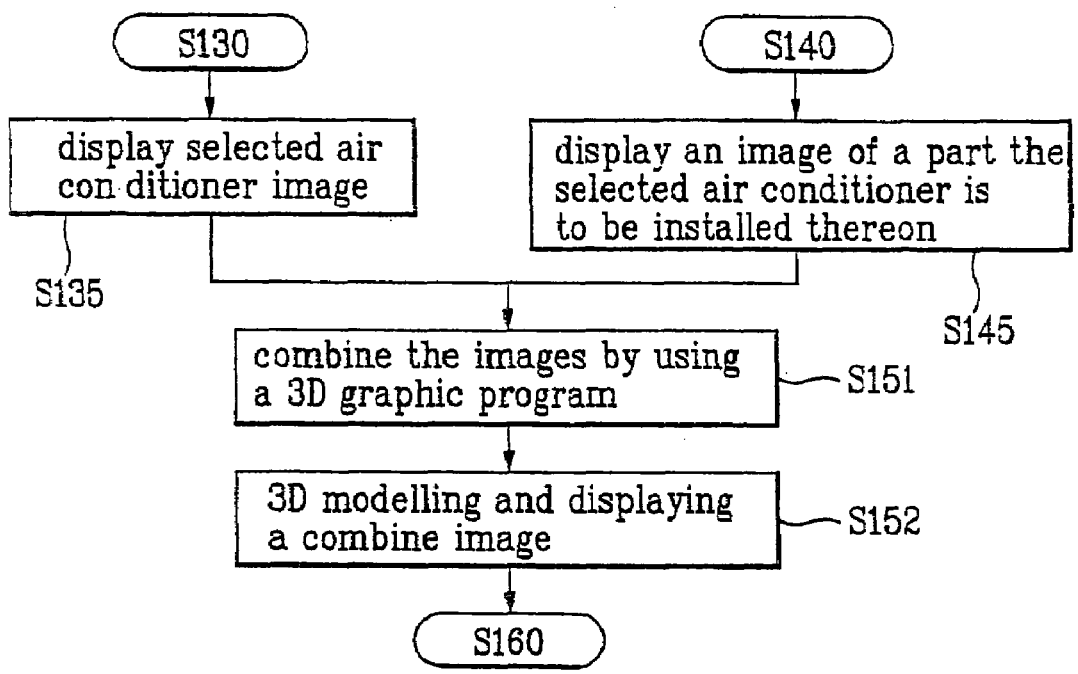
FIG. 8 illustrates a flow chart showing the substeps of the step for applying the selected product to the building to produce a 3D image in the process in FIG. 5.

FIG. 8 illustrates a flow chart showing the substeps of the step for applying the selected product to the building to produce a 3D image in the process in FIG. 5.

Referring to FIG. 8, when the inside image of the building is displayed on the web page thus, the web server 21 applies the 3D image of the air conditioner selected already to the display inside image of the building, and re-displays (S150). In this instance, even though a simulation is made such that the air conditioner is installed at an optimal position calculated by the web server 21, the client may fix the position of the air conditioner, directly as the case demands. This is possible because a graphic program for the simulation provides a function in which two or more than two images displayed on the web page can be combined, together. That is, when the client inserts (S151) a 3D image (S135) of a particular product on one of 3D images of two or more than two buildings displayed on the web page by using the drag and drop function, the web server 21 combines the images to conduct a real time 3D simulation and displays a result of the modeling on the web page (S152).

The foregoing process may be carried out with the 3D images displayed on different web pages, or on the same page, which are not limited in the present invention. The 3D simulation in the foregoing process is required to ascertain installation in various aspects, and zoom in/out of various parts, which are made the foregoing methods of different products. If the client is not satisfied of the displayed image during the foregoing process, the process may return to the step before the image is inserted, to select other building or product image, and insert to the other image (S160), or to an initial home page after canceling all the work, completely.

Figure 9:
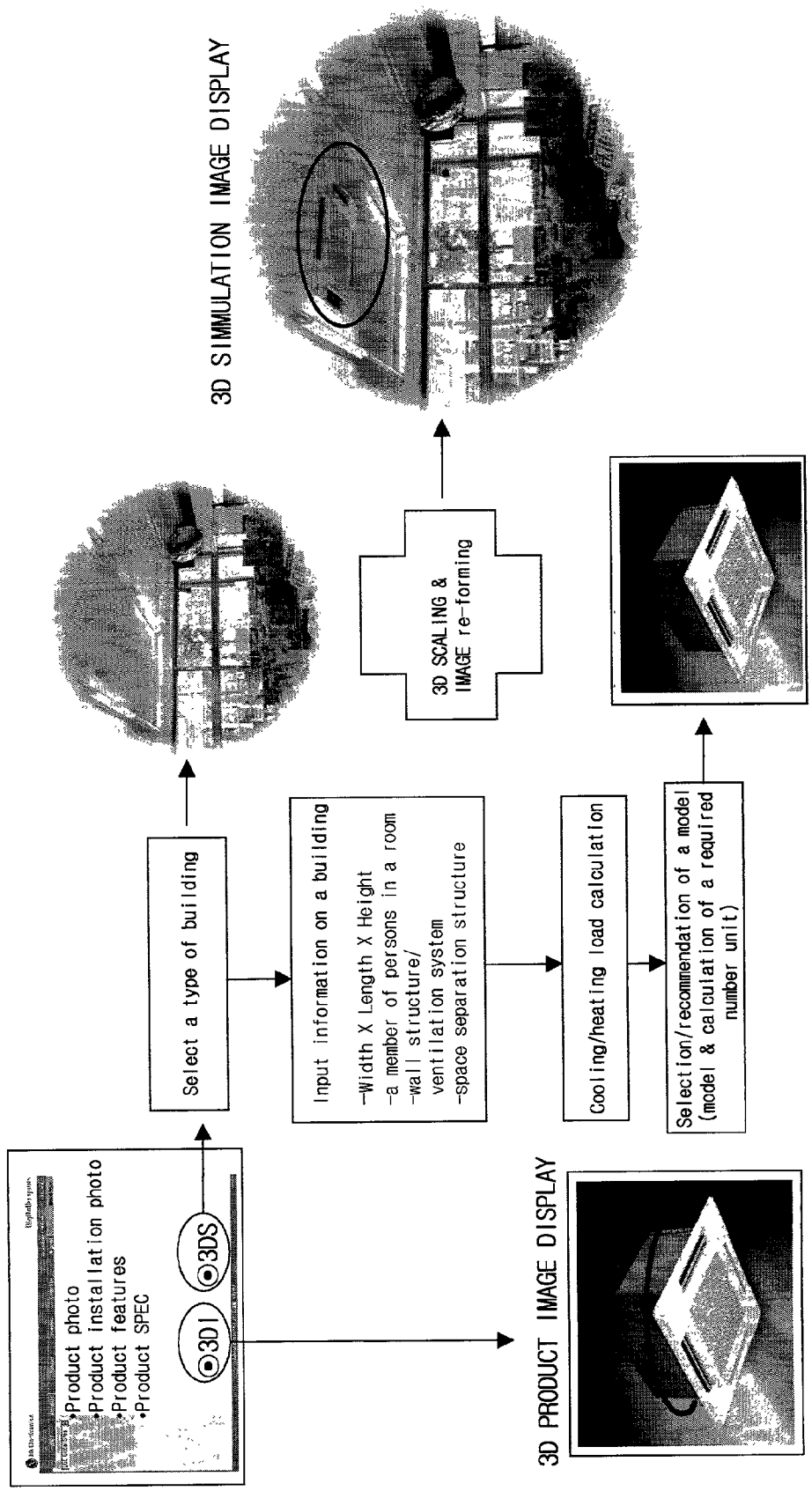
FIG. 9 illustrates a system showing an operation of a web page in accordance with the substeps in FIG. 8, schematically.

FIG. 9 illustrates a system showing an operation of a web page in accordance with the substeps in FIG. 8 schematically, wherein the search and selection process of the air conditioner and the building made on the web page and a 3D simulation of the selected air conditioner and the building are best shown taking an air conditioner of a type to be fitted to a ceiling as an example.

Figure 10:
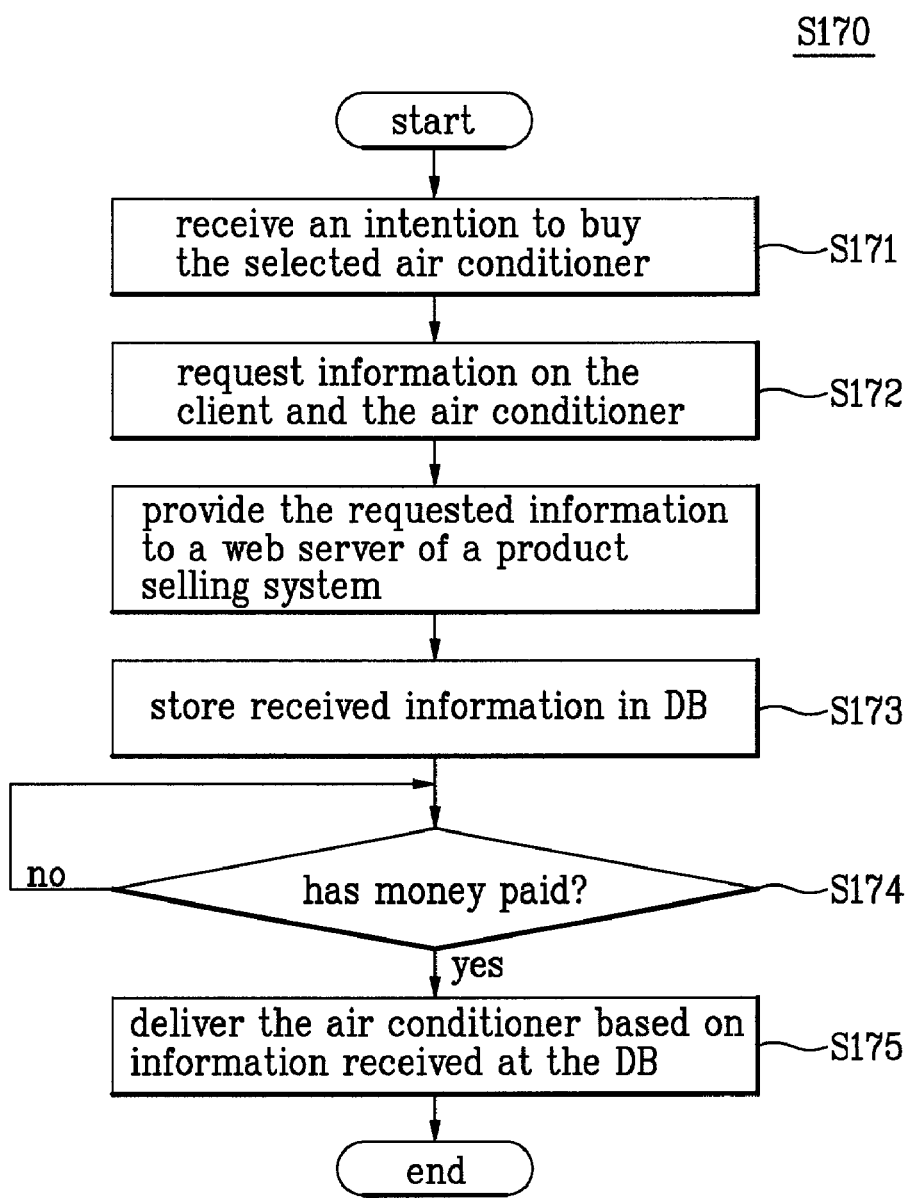
FIG. 10 illustrates a flow chart showing the substeps of the step for making an actual sale when a client determines to buy the product in the process in FIG. 5.

FIG. 10 illustrates a flow chart showing the substeps of the step for making an actual sale when a client determines to buy the product in the process in FIG. 5, wherein the determination of buying the air conditioner is informed to the web server of the product selling enterprise (S171), by clicking an air conditioner buy button on the web page, or by transmitting e-mail to, or calling the service provider. In this instance, the web server 21 of the service provider requests for various information on the client (S172), and stores the information in a separate client management data base 23 (S173). The data base 23 is managed separate from the image storage data base 22 having different product images and inside structure images of different buildings stored therein. That is, the data base is used as a data base for storage of various client information, various product sales information, delivery due date information, account settlements, and the like.

Then, after the various information is received, and the client settles accounts on the product (S174), the service provider delivers the products according to due date (S175), to complete all the process. The delivery of the product may be done by the service provider directly, or through a separate delivery enterprise 40. As for transaction of product sale, the client may be linked to a relevant site of an enterprise who has a specialty in the product sale, when the various client information stored in the data base 23 is transferred to the enterprise, for prevention of leakage of personal information to the maximum.

The system operating process of the present invention may not follow the foregoing process. That is, the step of selecting the part of the building specification to which the client intends to apply the product may be carried out before the step of the client selecting the product, which is possible by operating the web server such that the steps may be changed at the client's option.

In the meantime, it is not preferably that the method for operating the product selling system of the present invention provides the same services to all clients without taking a purchase volume of the client, and the like into account, at all. For this, it is preferable that the product selling system of the present invention classifies clients into a group of general individual having a small buying capability and an expert group having a large buying capability and additionally requiring specialty information exchange, and operates suitable to the classification.

Figure 11:
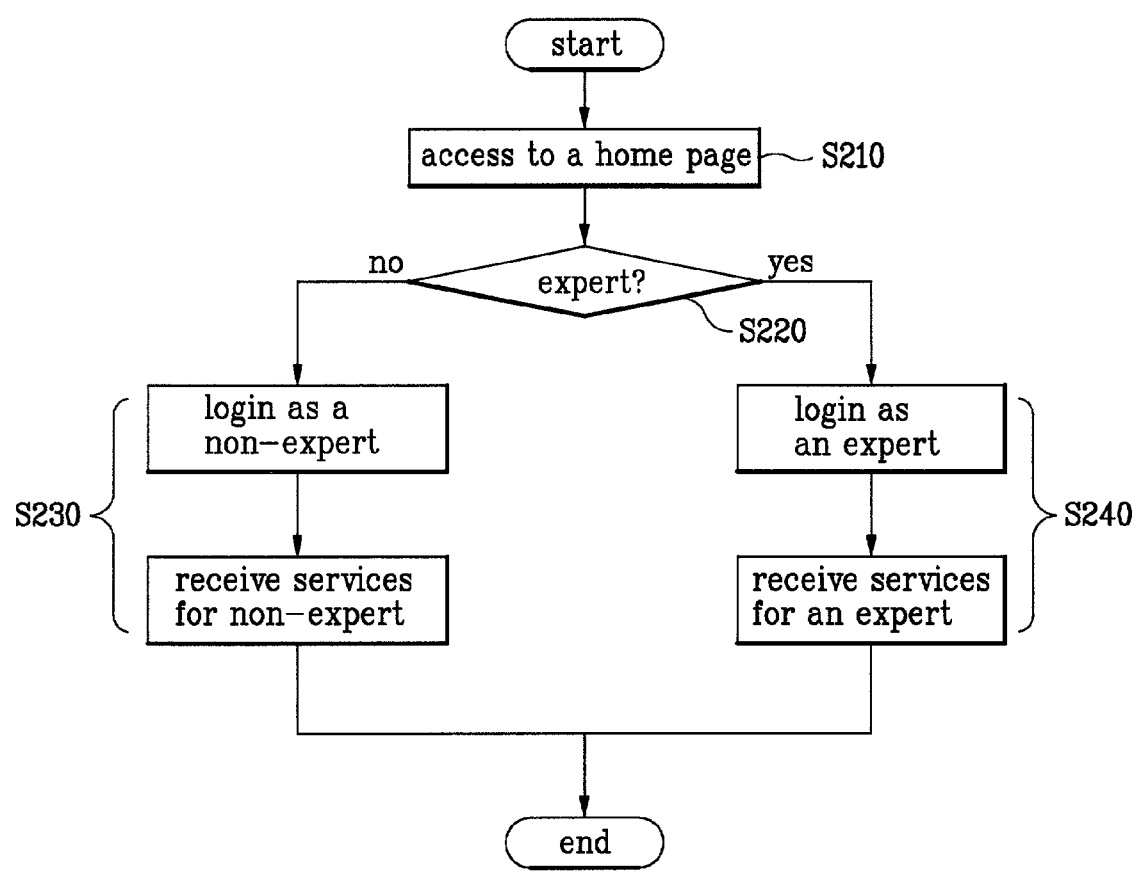
FIG. 11 illustrates a flow chart showing the steps of a process for making access to a web page by a client of the product selling system of the present invention.

FIG. 11 illustrates a flow chart showing the steps of a process for making access to a web page by a client of the product selling system of the present invention, referring to which a basic process for operating the product selling system will be explained.

When a client makes access to a home page of a service provider through Internet (S210), the web server 21 of the service provider identifies a class of the client through the home page (S220) from an identification code (a general ID) provided by the client for login, or from a requested special class service (a specialty service) of the client.

When the client is identified to be a general client through the foregoing process (or, non-expert in the field), the client is made to access to the web page of individuals (S230), and when the client is identified to be an expert working in a field of the product or a related field or buying the products in a large volume, the client is classified as an expert and made to access to the web page of the expert (S240), thereby providing services classified for respective clients.

The greatest difference of the services provided from the individual web page and the expert web page is detail, and purpose of the provided information. That is, the service available from the individual web page is brief information on different service objects, for simple buying of individual products, and the service available from the expert web page is detail information on different service objects and various necessary documents, for use as information required to buy a large sized volume of the product or guidance for installation of the product. The brief information on different service objects includes a name of the product, a size, a price, and the like, which an individual can make an easy access, and is at a level an individual can understand, easily. The detail information on different service objects and various necessary documents includes design drawings, product know-how, and technical data of the selling product the service provider (or an on-line product selling enterprise) is in possession, inclusive of all the brief information.

Figure 12:
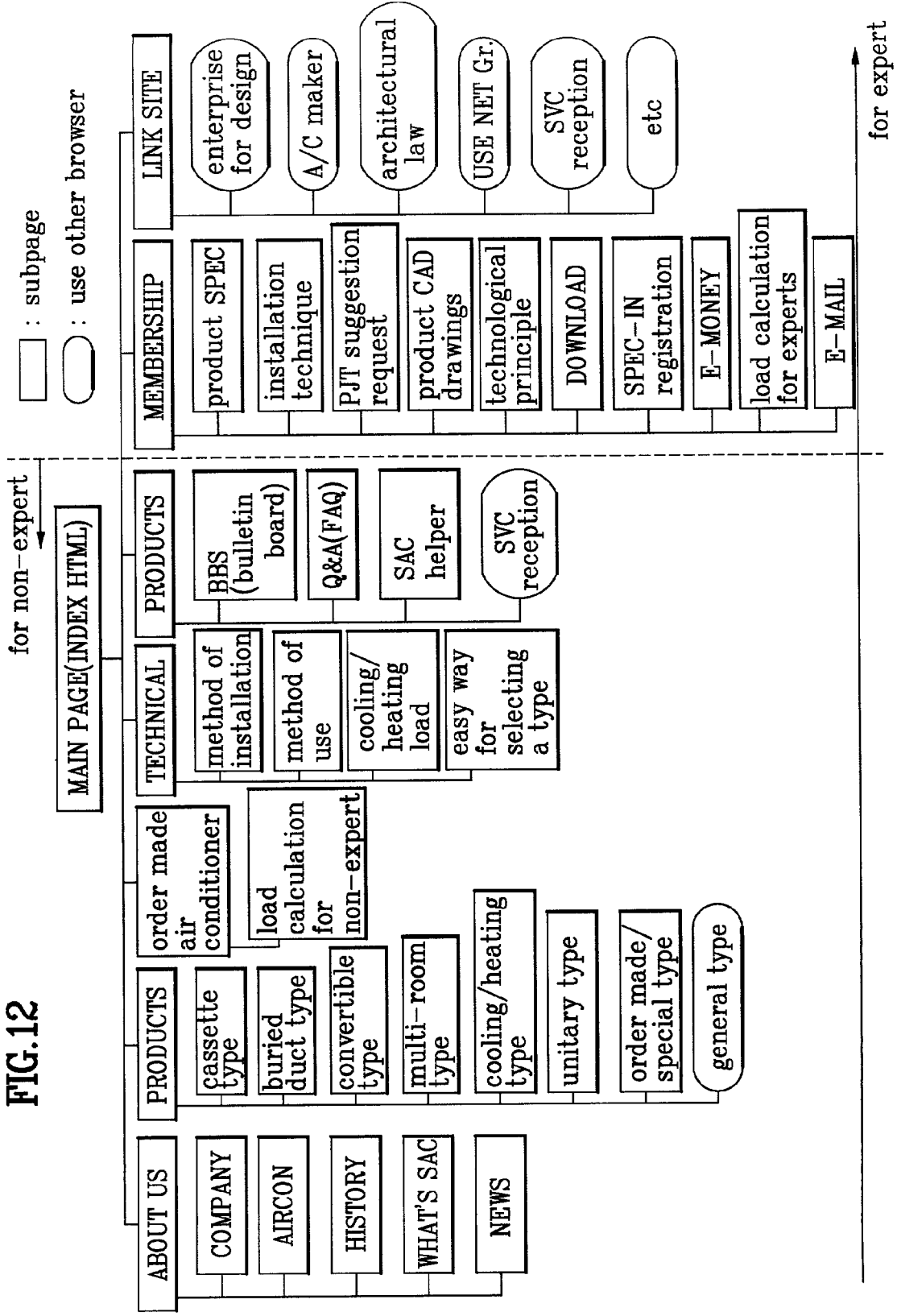
FIG. 12 illustrates a system showing types of services selectively provided to clients according to clients, schematically.

FIG. 12 illustrates a system showing types of services selectively provided to clients according to classification of clients, schematically. However, it is understandable that the classification is not limited to the two as shown in the foregoing embodiment, but may be many. The ID provided to each client in the login step may be provided at the time of a membership subscription the same as the related art, or the web server may be built such that a selective access to the web page can be made without login of the ID. However, it is preferable that an access to the expert web page requires a precise identification of the client, for preventing an individual or a person with no good intention from making access to the expert web page and receiving the expert service in advance. That is, a service data provided on the expert web page is difficult for the individual to understand, and the service data known to the person with no good intention may harm, not only the service provider, but also the expert members. Therefore, it is preferable that the service provider prepares a standard for qualifying experts. When the individual and the expert logs-in to relevant web pages by using own IDs through the foregoing steps, the web server which manages the web pages can provide services provided differently for the clients.

The service provided to the individual is identical to the service provided to individuals in a related art general e-commerce. That is, the services to the individuals are inclusive of at least any one of brief guidance on kinds, and appearances of products, direction of use of the products, and a load calculation for individuals, which will be explained in detail. In a case an individual selects a necessary product on the web page and requests to buy the product through the web page, the service provider requests the individual a payment for the product through a banking organization connected to the service provider. In this instance, a settlement of accounts is made through a network 31 for a small amount of money in the banking organization. Upon reception of the settlement of accounts from the banking organization, the service provider delivers the product, directly, or through a separate delivery enterprise 40, of which detailed explanation will be omitted.

On the other hand, the service provided from the expert web page is different from the service provided to the individuals, and includes e-commerce between enterprises, actually. FIGS. 13~18 illustrate the steps of a method for operating an expert web page in the method for operating a product selling system of the present invention, taking a case as an example, when the service provider is an air conditioner seller, and the client is a building owner or a design office for designing buildings.

At first, the client joins as an expert member to the web page the service provider operates. Then, by making an access to the expert web page by using the ID provided to the member (S241), the client receives detailed information on the air conditioner intended to install in a building under construction (or intends to build) (S242). The detailed information includes, not only all the information provided to the individuals, but also detailed information on the product, such as product numbers of different kinds of air conditioners, cooling/heating loads, a size of the product, a suitable room size, price, a photograph of the product, specification, technique for installation, product drawings, basic technology of the air conditioner, and the like, inclusive of various site information related to the product.

Figure 13:
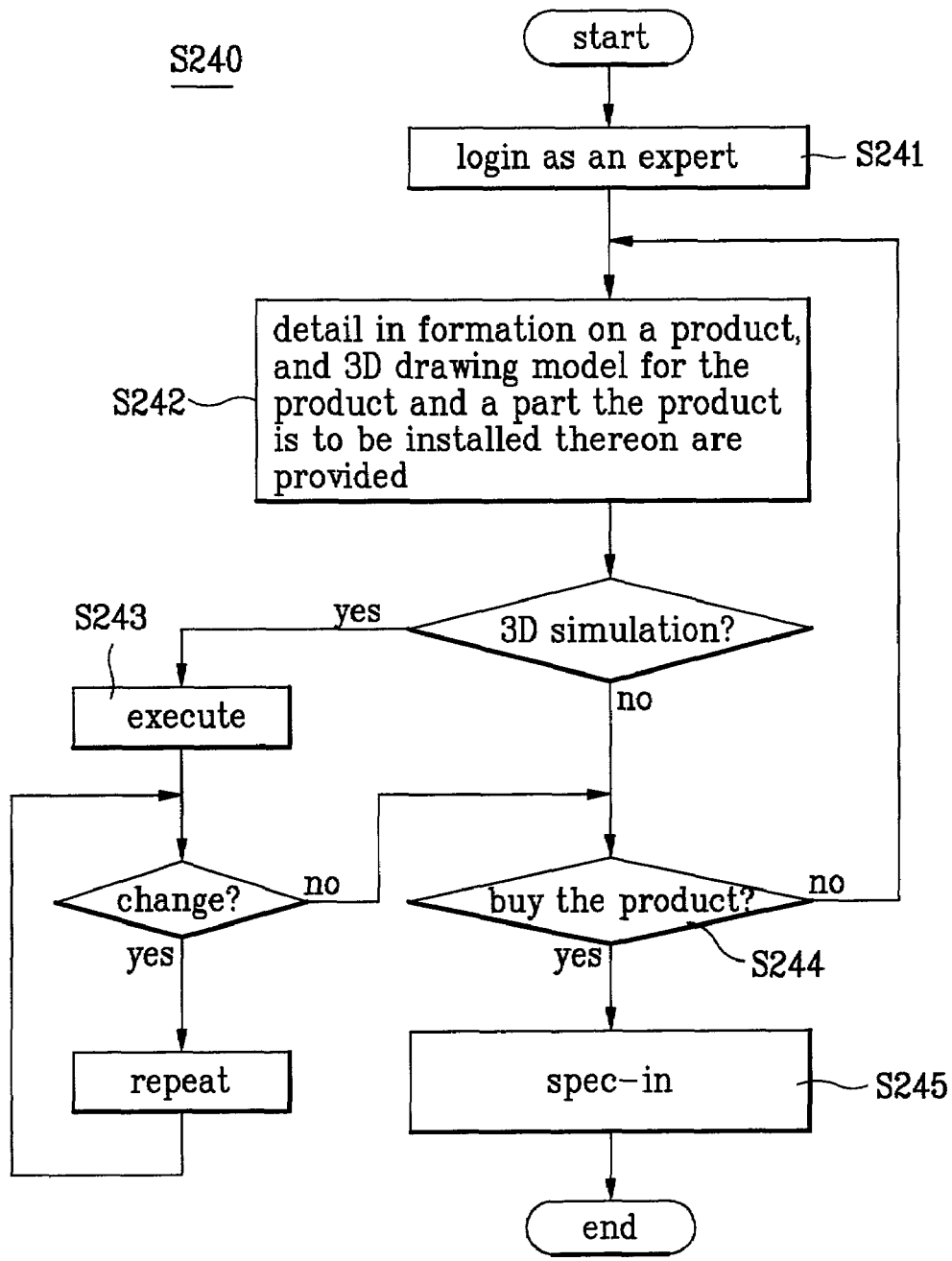
FIG. 13 illustrates a flow chart showing the substeps of the step for operating an expert web page in a process for operating a system in FIG. 11.
Figure 14:
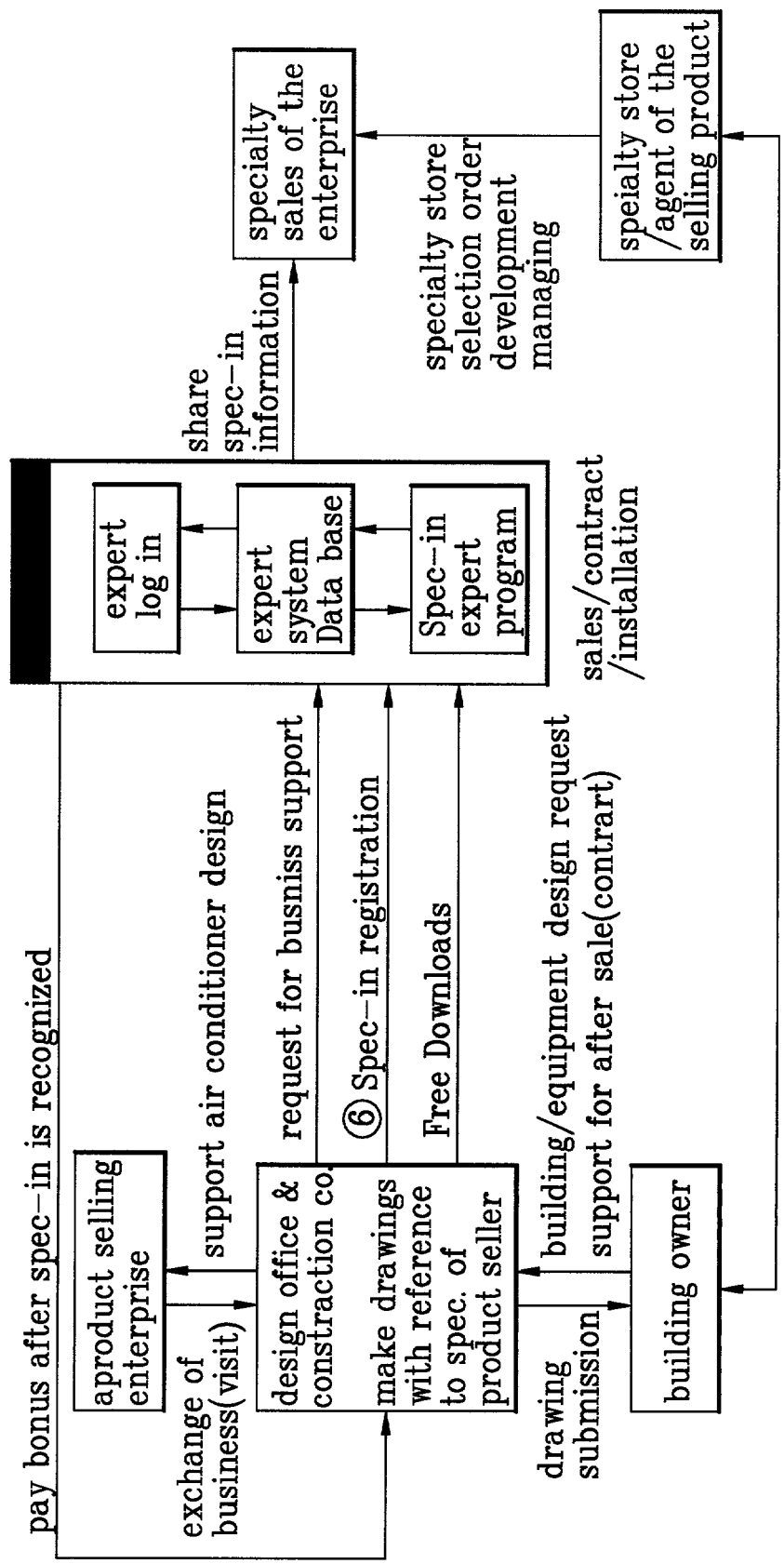
FIG. 14 illustrates a system showing the process in FIG. 13 in more detail.

The information on air conditioner may be displayed on the web page in a 3D image directly, or e-mailed to the client, at the client's option. Moreover, information exchange between the client and other clients in the field of the business may be provided by using a mail service, a notice board, or data room provided on the web page, and a direct communication between the client and a manager in the service provider may be provided by using video chatting. Examples of the type of information which may be exchanged using the process of FIG. 13 is shown in FIG. 14.

For example, the client may input a specific model number directly for receiving detail information on a required product, or select a product from recommended products. For an example, if the client only knows an inside structure of the building, a product search by using the information is made available. That is, a request to the client is made, for the client to write information the client has on an information input space on the web page the service provider 20 operates, and, when the information is written, a data on a product meeting the written information is searched from the product information storage data base 22.

The information the client has is a detail information on the building the client intends to build, inclusive of at least one of purpose of the building, required cooling/heating loads of the building, an inside space size of the building, persons in the room (an average, or a greatest number of persons in the room), inside material of the building, a ventilation system of the building, an internal structure of the building, a floor number the product is to be installed, and the like. When the client writes at least one kind of the various kinds information the web page requests, the web server 21 operating the web page searches more than one product meeting the written information, and displays on the web page. The program used for searching the products may be in general an engine for content based retrieval technique, or an engine for annotation based retrieval, and the like.

If the information the client input is the cooling/heating loads, the web server 21 searches kinds and a number of air conditioners of the written loads by using the above program, and displays a result of the search on the web page. If a customer wants a shape of the air conditioner to be presented in a 3D image or drawings, so that the client can make a virtual installation of the air conditioner at the inside space of the building the client intends to install, the 3D simulation is executed (S243).

Figure 15:
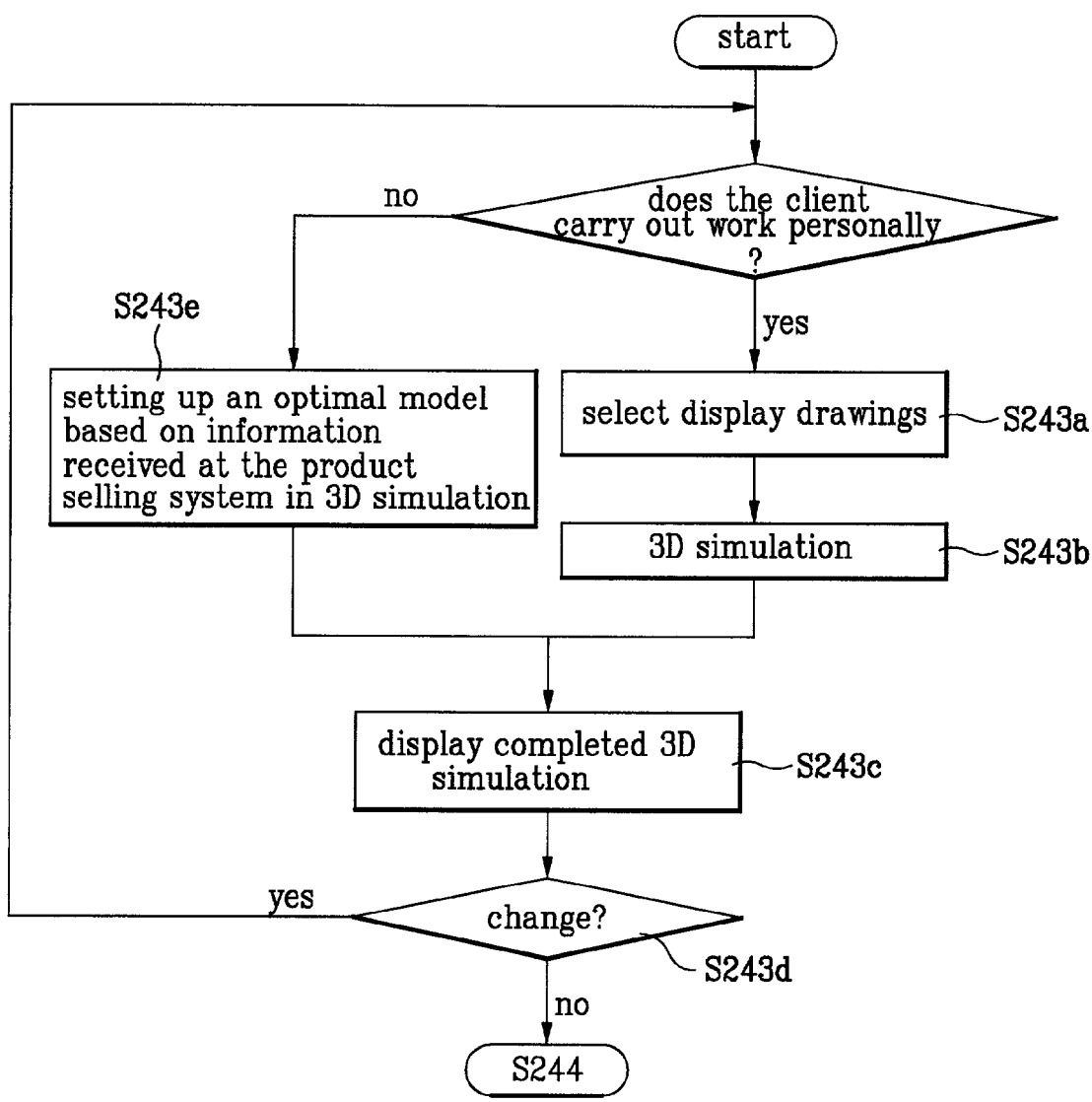
FIG. 15 illustrates a flow chart showing the substeps of the step for applying the selected product to a design drawing to produce a 3D image in the process in FIG. 13, in more detail.

Execution of the 3D simulation is shown in more detail in FIG. 15. To do this, the client is required to display the drawings of the building intended to build, and however, if the client has no drawings of the building, the client may select a sample of a building having a structure similar to the building the client intends to build from various sample buildings the service provider exhibits (S243a). This service is made available by storing various kinds of drawings and displaying the drawings as requested. Then, the drawing of the air conditioner the client selected is applied to the drawing of the building either the client shown or the service provider suggests by using a graphic program provided on the web page (S243b). The program may be a general program used for various design and architectural design, and, more preferably, a program that can provide a 3D simulation function for permitting, not only display of drawings, but also a 3D image display of an inside structure of the building and product. It is preferable that the graphic program is a program having a function for combining two or more than two drawings. By applying a product image to a drawing of the building displayed on the web page by using the drag and drop function, to make a realtime 3D simulation to combine the two images and display a result of the application on the web page, the client can ascertain a proper application with easy (S243c). The display may be in 3D or in drawings. If a result of the foregoing application is not satisfactory to the client, the client returns to the step before the application, so that the client selects drawings of other building, or other product, and makes a required application, again (S243d).

In the meantime, the client may not carry out the application, personally. That is, the service provider receives design drawings of the building the client intends to build, compares to drawings to different product information stored in the data base, selects a product fit to an inside structure of the building of the design drawings, and suggests to the client (S243e). The building design drawings may be delivered to the service provider, by mail or by hand through other person, or by e-mail for full computerization and time saving.

In the meantime, on the expert web page, a service for calculating cooling/heating loads may also be provided to the experts. The information required for calculation of the cooling/heating loads is specially known to the clients who design buildings. That is, the information includes purposes of the building, equipments in the building, and an inside structure of the building. The purposes of the building are sorted according to an amount of activities of the people living or moving in the building, and may be, for an example, a theater, a school, an office, a hotel, a department store, a bank, a restaurant, a factory, a dance hall, a blowing building, a health club, and the like. The equipments in the building may be a ventilation system which gives an influence to the cooling/heating, fans, refrigerators, manufacturing machines, electric heating instruments, such as fluorescent lamps, and the like. The inside structure of the building may be materials of an inside wall of the building, sizes and number of windows, a height between floors, a number of rooms, and areas of enclosable spaces.

FIGS. 19A, 19B, and 19C illustrate examples of tables for different situation used for calculation of heating loads.

Figure 18:
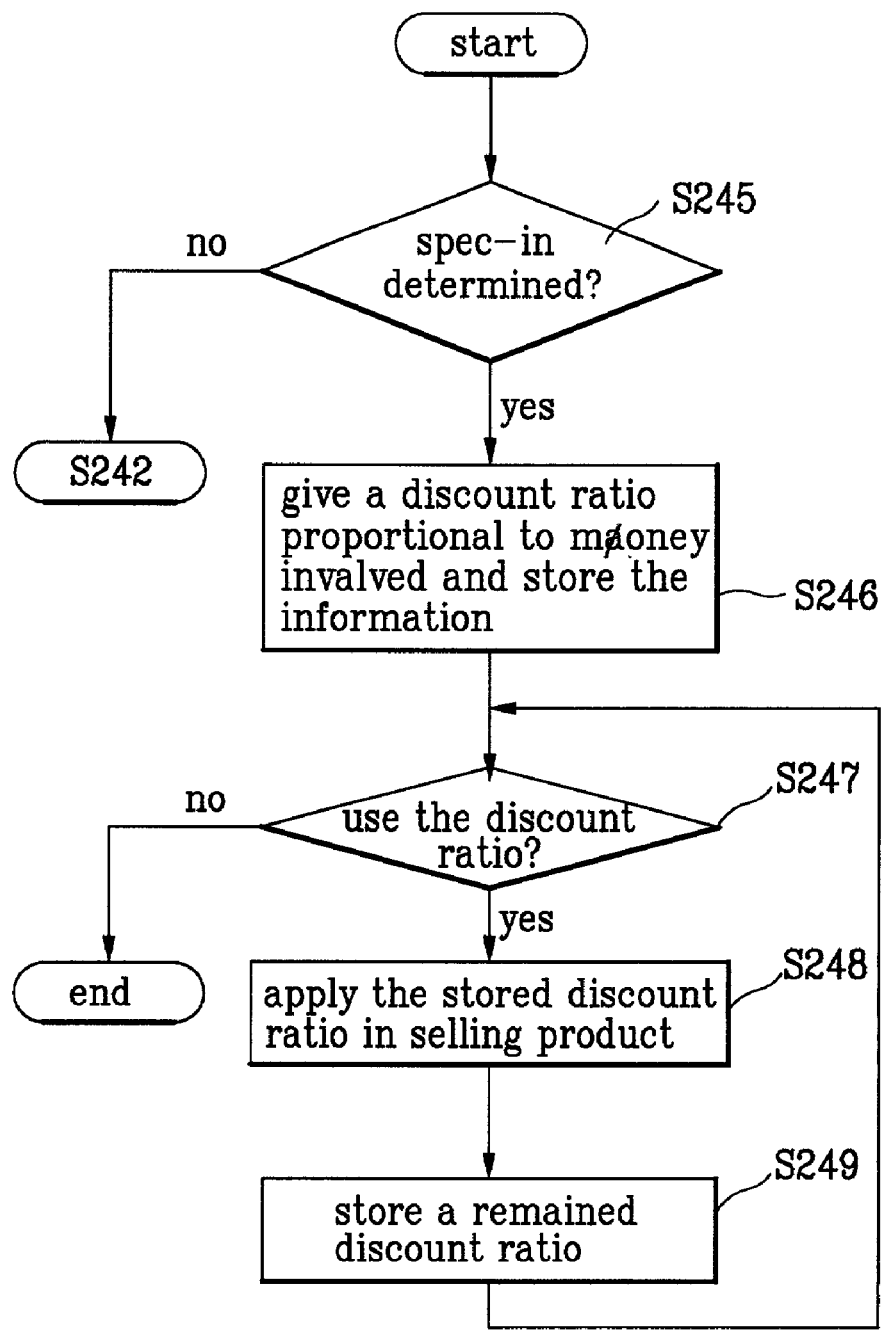
FIG. 18 illustrates a flow chart showing the steps of a process for providing various extra options to a client after the spec-in is made; and, FIGS. 19A, 19B, and 19C illustrate examples of tables for different situation used for calculation of heating loads.

As shown in FIG. 18, once the client determines to buy a product (the air conditioner the client fixes, or the air conditioner the service provider suggested) according to the foregoing process (S244), spec-in of the drawing is made (S245). The spec-in is putting a product name on the design drawings for approval from a relevant ward office on starting of the building. For reference, once the spec-in is made, the building is expected to be built with the product installed thereon, unless there is an amendment to the design, separately.

Figure 16:
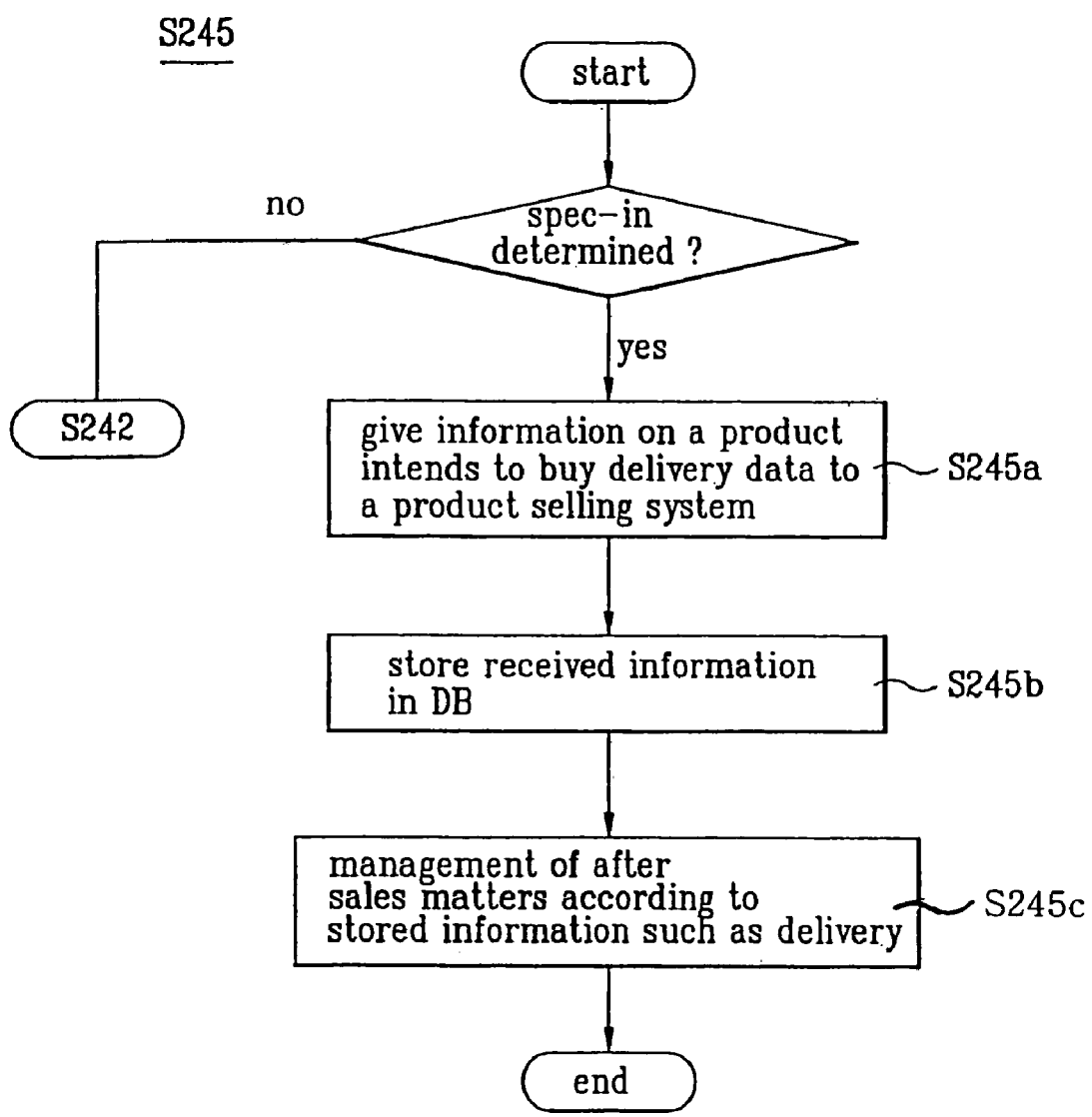
FIG. 16 illustrates a flow chart showing the substeps of the step for making a spec-in when a client fixes to buy a product in the process in FIG. 13, in more detail.
Figure 17:
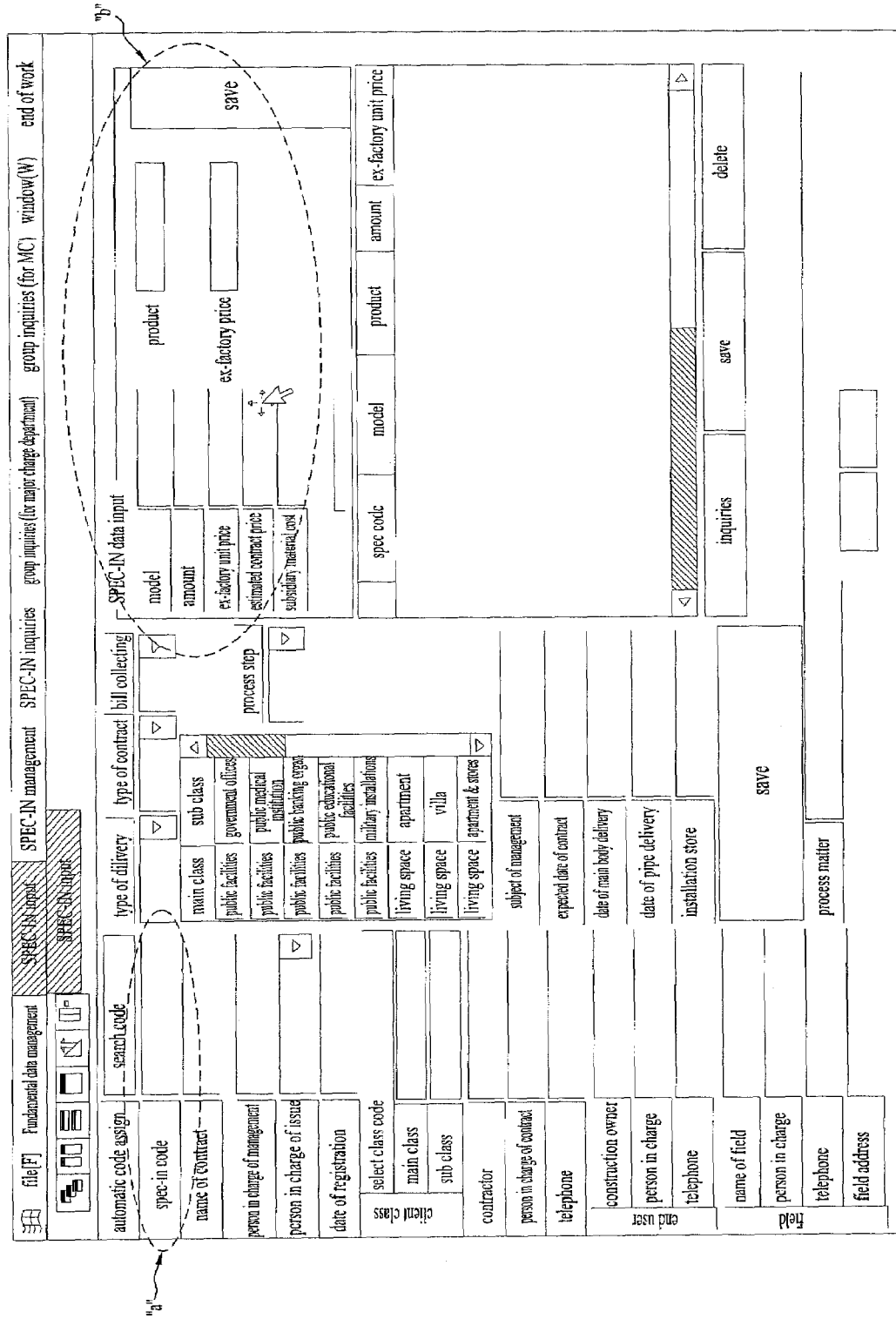
FIG. 17 illustrates a system for operating a web page for making a spec-in management.

Spec-in of the drawings (S245) is shown in more detail in FIG. 16. Once the spec-in is made on the air conditioner, the fact of spec-in is informed to the service provider (S245a), then, the service provider, having informed of the fact, stores various data of the spec-in and the building design drawings in the data base, and informs the data storage to the client (S245b). Once the pertinent information is stored, the remainder of the transaction is managed based on the stored information (245c). The various data of the spec-in includes information on the client who made the spec-in, a model number and product name of the air conditioner ordered, a number of sets of the ordered air conditioners, a contract price of the air conditioner at the time of order, a delivery due date, a contract date, the purpose of the building the air conditioner to be installed, information on a place of installation, and the like. The information on the client includes a report on a family of a building owner, if the client is the building owner, or an enterprise name, a person in charge, a status of building, a building site, a telephone number, and the like if the client is a contractor or a design office. An example of realizing the foregoing process on the web page is shown in FIG. 17.

In a case a location of the site the client desires the air conditioner is to be delivered thereto is a country side, the service provider may transfer the spec-in information to a local product seller (especially, business units and selling agencies) at the country, for an exact and quick delivery of the product regardless of the location of the client. Especially, it is preferable that the operation of the system of the present invention is merely limited only to advertisement and sales of the product, and an actual product sale is carried out by respective business units or each of business departments operated by the business units.

As explained before, the different spec-in information stored in the data base is used for delivering the product at the due date, and for carrying out a required change if there is any request for changing the product, later. Of course, the data base is formed such that the spec-in information stored in the data base may be provided to the client if the client requests.

Considering that settlement of accounts by payment in full of the client following completion of the contract is very difficult, the settlement of accounts is made through a large amount account settlement system of a banking organization. A detailed explanation of the large amount account settlement system will be omitted, and it is preferable that the large amount account settlement system is made under discussion with the banking organization.

The present invention does not limit that an e-commerce is completed only by the foregoing process. That is, as a volume of transaction between enterprises is large, it is preferable that an extra option proportional to an entire payment is given to the client for inducing more clients. As shown in FIG. 18, upon completion of all selling process as the spec-in is fixed (S245), an extra option proportional to the amount of sale is given to the client, and a detail of the option is stored in the data base 23 which is provided for storing information on client (S246). The extra option may be a discount ratio proportional to the amount of sale, or separate goods or cash, or a discount ratio to be given to the client when the client buys a product of the service provider or other service provider having a business connection with the service provider. Thereafter, when the client desires to be applied of the discount ratio in a relevant transaction (S247), the client can buy the product with a discount for the entire payment at the given discount ratio (S248). In this instance, the service provider calculates a remaining discount ratio of the client and stores in the data base (S249).

It is understandable that the product of the present invention of the service provider is not limited to the air conditioner, but any one of product given as an option in a building, such as various electronic appliances, sinks and cupboards, furniture, different wash basins in bath rooms, lighting fixtures, interphones, elevators, escalators, and the like.

As has been explained, the product selling system, and the method for operating the same of the present invention have the following advantages.

As, not only detail shape of a product, but also virtual installation of the product at a residential place of a client or a part the product is to be installed, can be known by 3D simulation, a reliability of a required product selection is improved, that reduces returns of once sold products, leading to reduce a material handling cost to the minimum.

The availability of virtual installation of the product at a building by a simulation in a case of a large volume order from a client of an enterprise (particularly, a building owner), efforts for installation design is saved, and selection of the product is easy.

The classified services varied with the individuals and enterprises permit provision of service fit to the clients themselves, that improves satisfaction to the service the client received.

The provision of expert services at the enterprise/expert service web page permits the expert to solve the inconvenience of personal search of a desired product and production of design drawings of the product from searched information, that improves a reliability from the client.

A whole e-commerce can be made even if the client is a building designer or enterprise, that eliminates the necessity of personal visit to the clients for advertisement of the various products, permitting to reduce a man power requirement to the minimum.

It will be apparent to those skilled in the art that various modifications and variations can be made in the product selling system, and the method for operating the same of the present invention without departing from the spirit or scope of the invention. Thus, it is intended that the present invention cover the modifications and variations of this invention provided they come within the scope of the appended claims and their equivalents.

What is claimed is:

1. A method for operating an air conditioning system selling system, comprising:
providing access to a web server of an air conditioning system selling enterprise through a client network;
allowing searching for a required air conditioning system;
modeling a three dimensional (3D) image of the required air conditioning system and displaying a corresponding 3D image of the required air conditioning system on a web page;
simulating a 3D installation of the air conditioning system in a venue in which the air conditioning system is to be installed and displaying the simulated 3D installation on the web page, wherein a 3D image of the venue is generated based on a purpose of a building, an inside volume, an estimated number of persons in a room, an inside material, a type of ventilation system, an internal structure, or a floor number on which the air conditioning system is to be installed; and
receiving information required for selling the air conditioning system if a purchase order for the air conditioning system is received, returning to a prior step if a cancel order is received, and repeating the foregoing steps if a request for a search for alternative air conditioning systems is received.

2. The method as claimed in claim 1, wherein allowing searching for a required air conditioning system further comprises retrieving information for a plurality of air conditioning systems and displaying the plurality of air conditioning systems and related information on the web page.

3. The method as claimed in claim 1, wherein allowing searching for a required air conditioning system further comprises receiving information related to a required air conditioning system and searching for a product that falls within a required specification.

4. The method as claimed in claim 3, wherein the information related to the required air conditioning system includes structural information related to an installation site of the air conditioning system and an intended use of the air conditioning system.

5. The method as claimed in claim 1, wherein the air conditioning system is intended to be installed and used in a building.

6. The method as claimed in claim 1, wherein the information related to the venue in which the air conditioning system is to be installed includes an allowable load.

7. The method as claimed in claim 6, further comprising:
receiving the allowable load when information related to the venue in which the air conditioning system is to be installed is received;
selecting an air conditioning system which is appropriate for the allowable load; and
displaying the appropriate air conditioning system and related information.

8. The method as claimed in claim 7, further comprising:
performing a calculation based on the information provided; and
selecting an appropriate air conditioning system based on a result of the calculation.

9. The method as claimed in claim 7, wherein the related information comprises a model number of the selected air conditioning system.

10. The method as claimed in claim 1, further comprising:
selecting at least one air conditioning system which meets requirements related to the venue information; and
displaying a corresponding 3D image of the selected air conditioning system on the web page after receiving the information related to the venue in which the air conditioning system is to be installed.

11. The method as claimed in claim 1, further comprising:
selecting a 3D sample image of at least one internal structure of a building which corresponds to the venue information; and
displaying the 3D sample image on the web page.

12. The method as claimed in claim 1, further comprising:
receiving information on a venue in which the air conditioning system to be installed after displaying the corresponding 3D image of the required air conditioning system on the web page.

13. The method as claimed in claim 12, wherein the information on the venue in which the air conditioning system is to be installed includes an allowable load.

14. The method as claimed in claim 13, further comprising:
receiving the allowable load when information on the venue in which the air conditioning system is to be installed is received;
selecting an air conditioning system which is appropriate for the allowable load; and
displaying the appropriate air conditioning system and related information.

15. The method as claimed in claim 12, further comprising:
selecting at least one air conditioning system which meets requirements related to the venue information; and
displaying a corresponding 3D image of the selected air conditioning system on the web page after receiving information related to the venue in which the air conditioning system is to be installed.

16. The method as claimed in claim 12, further comprising:
selecting a 3D sample image of at least one internal structure of a building which corresponds to the venue information and displaying the 3D sample image on the web page.

17. The method as claimed in claim 1, wherein simulating a 3D installation and displaying the simulated 3D installation on the web page includes providing a drag and drop capability by which a 3D image of an air conditioning system may be dragged and dropped onto a 3D image of an internal structure of a building displayed on the web page.

18. The method as claimed in claim 1, wherein simulating a 3D installation and displaying the simulated 3D installation on the web page includes providing a 3D movement of the 3D product image and zooming in and out functions.

19. The method as claimed in claim 18, wherein the 3D movement and the zooming in and out functions are controlled by at least one input device.

20. The method as claimed in claim 1, wherein simulating a 3D installation and displaying the simulated 3D installation on the web page further comprises allowing for repositioning the 3D image of the air conditioning system to adjust an installation position of the air conditioning system in real time.

21. The method as claimed in claim 1, wherein searching for a required air conditioning system further comprises:
providing access to a web page based on a classification, wherein a classification is based on a purpose of access and a level of expertise; and
selectively providing air conditioning systems and related information based on the classification.

22. The method as claimed in claim 21, further comprising:
providing a first set of information for an individual, non-expert classification; and
providing a second set of information on a plurality of air conditioning systems and receiving additional information for an expert classification, wherein the second set of information is more detailed than the first set of information.

23. The method as claimed in claim 22, wherein the second set of information includes the first set of information.

24. The method as claimed in claim 22, further comprising:
enabling a 3D graphic representation of a selected building by using a graphic program in communication with the web page when a request for a types of buildings option is received; and
placing a selected air conditioning system into the enabled 3D graphic representation of a selected building for simulation of installation.

25. The method as claimed in claim 22, further comprising:
receiving drawings of a building;
representing the building in a 3D graphic image using a graphic program which is separate from but in communication with the web page; and
placing a 3D graphic image of a selected air conditioning system into the 3D graphic image of the building for simulation of installation.

26. The method as claimed in claim 25, wherein the building comprises an existing structure.

27. The method as claimed in claim 22, further comprising:
comparing information related to a plurality of air conditioning systems stored in a data base to design drawings of a building; and
selecting an air conditioning system and fitting the air conditioning system to an internal structure of the building on the design drawings.

28. The method as claimed in claim 27, further comprising:
receiving an email with a file containing design drawings which have been converted into data.

29. The method as claimed in claim 28, wherein fitting the air conditioning system to the internal structure of the building includes applying the air conditioning system to the design drawings of the building that have been converted into data, and transmitting the product fit to the internal structure in an e-mail.

30. The method as claimed in claim 27, wherein selecting a air conditioning system and fitting the air conditioning system to the internal structure of the building includes simulating an application of the air conditioning system to the internal structure of the building on the design drawings, and displaying the simulation on the web page.

31. The method as claimed in claim 27, wherein the building comprises a structure which has not yet been built.

32. The method as claimed in claim 1, further comprising:
storing client information required for a purchase in a data base when a purchase order is received by the web server of the air conditioning system selling enterprise.

33. The method as claimed in claim 32, wherein the client information required for a purchase includes a type of air conditioning system, a quantity of air conditioning system, and a delivery due date of the air conditioning system.

34. The method as claimed in claim 32, further comprising:
providing a payment adjustment which is proportional to a total amount of money involved when the air conditioning system selling enterprise receives the client information required for a purchase.

35. The method as claimed in claim 34, wherein the option includes at least one of a discount ratio proportional to a total amount of money involved, separate goods, a cash rebate, and a discount ratio applicable when purchasing air conditioning system from the air conditioning system selling enterprise and other enterprises associated with the air conditioning system selling enterprise.

36. A method for selling an air conditioning system, comprising:
providing access to a web server of an air conditioning system selling enterprise;
receiving an appropriate classification from a plurality of classifications based on a purpose of access and a level of expertise;
searching for a required air conditioning system;
providing a first set of information related to the required air conditioning system for an individual, non-expert classification;
receiving additional information related to installation requirements for the required air conditioning system including drawings of a building into which the required air conditioning system is to be installed, and providing a second set of information related to the required air conditioning system for an expert classification;
simulating a three dimensional (3D) installation of the required air conditioning system and displaying the simulated installation on a web page; and
repeating the searching, providing, receiving, and simulating steps until a purchase order is placed.

37. The method of claim 36, further comprising:
representing the building in a 3D graphic image based on the drawings received; and
positioning a 3D graphic image of a selected air conditioning system in the 3D graphic image of the building and simulating an installation of the air conditioning system in the building.

* * * * *